United States Patent
Kawamoto et al.

(10) Patent No.: US 9,147,140 B2
(45) Date of Patent: Sep. 29, 2015

(54) IMAGE PROCESSING APPARATUS, METHOD, AND PRODUCT FOR CONVERTING IMAGE DATA INTO FEWER GRADATIONS BASED ON TOTAL VALUE OF PIXELS IN A GROUP EXCEPT FOR A DETECTED PIXEL HAVING A SPECIFIC VALUE

(71) Applicant: CANON KABUSHIKI KAISHA, Tokyo (JP)

(72) Inventors: Tomoyuki Kawamoto, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/186,511

(22) Filed: Feb. 21, 2014

(65) Prior Publication Data

US 2014/0285851 A1  Sep. 25, 2014

(30) Foreign Application Priority Data

Mar. 22, 2013  (JP) .................................. 2013-060269

(51) Int. Cl.
*H04N 1/405* (2006.01)
*G06K 15/02* (2006.01)

(52) U.S. Cl.
CPC ............ *G06K 15/1881* (2013.01); *H04N 1/405* (2013.01)

(58) Field of Classification Search
None
See application file for complete search history.

(56) References Cited

U.S. PATENT DOCUMENTS

| 7,503,634 | B2 * | 3/2009 | Takahashi et al. | 358/1.9 |
| 7,813,007 | B2 * | 10/2010 | Kakutani | 358/3.09 |
| 8,023,151 | B2 * | 9/2011 | Kakutani | 358/3.16 |

FOREIGN PATENT DOCUMENTS

| JP | 2007-82090 A | 3/2007 |
| JP | 2007-194904 A | 8/2007 |

* cited by examiner

*Primary Examiner* — Scott A Rogers
(74) *Attorney, Agent, or Firm* — Canon USA Inc. IP Division

(57) ABSTRACT

An image processing apparatus capable of converting input image data into image data expressing a dot pattern cell by cell includes a detection unit configured to detect a pixel having a specific pixel value in the input image data, and a determination unit configured to determine an output value of a pixel included in each cell by arranging as many print pixels as a number of print pixels according to a total value of pixel values of a pixel group including pixels included in a cell except the pixel detected by the detection unit on any of the pixels in the pixel group cell by cell.

17 Claims, 21 Drawing Sheets

FIG.5

|   | 6 | 8 |   |
|---|---|---|---|
| 7 | 1 | 2 | 5 |
|   | 3 | 4 |   |

FIG.9A

| NUMBER | INFLUENCE AMOUNT |
|---|---|
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |

FIG.9B

| NUMBER | INFLUENCE AMOUNT |
|---|---|
| 1 | 0 |
| 2 | 0 |
| 3 | 0 |
| 4 | 0 |
| 5 | 0 |
| 6 | 1 |
| 7 | 1 |
| 8 | 1 |
| 9 | 1 |
| 10 | 1 |

FIG.9C

| NUMBER | INFLUENCE AMOUNT |
|---|---|
| 1 | 0 |
| 2 | 0 |
| 3 | 0 |
| 4 | 0 |
| 5 | 0 |
| 6 | 1 |
| 7 | 2 |
| 8 | 2 |
| 9 | 2 |
| 10 | 2 |

| NUMBER | INFLUENCE AMOUNT |
|---|---|
| 1 | 0 |
| 2 | 1 |
| 3 | 1 |
| 4 | 2 |
| 5 | 3 |
| 6 | 4 |
| 7 | 5 |
| 8 | 5 |
| 9 | 5 |
| 10 | 5 |

FIG.16

|     | 176 | 240 |     |
|-----|-----|-----|-----|
| 208 | 16  | 48  | 144 |
|     | 80  | 112 |     |

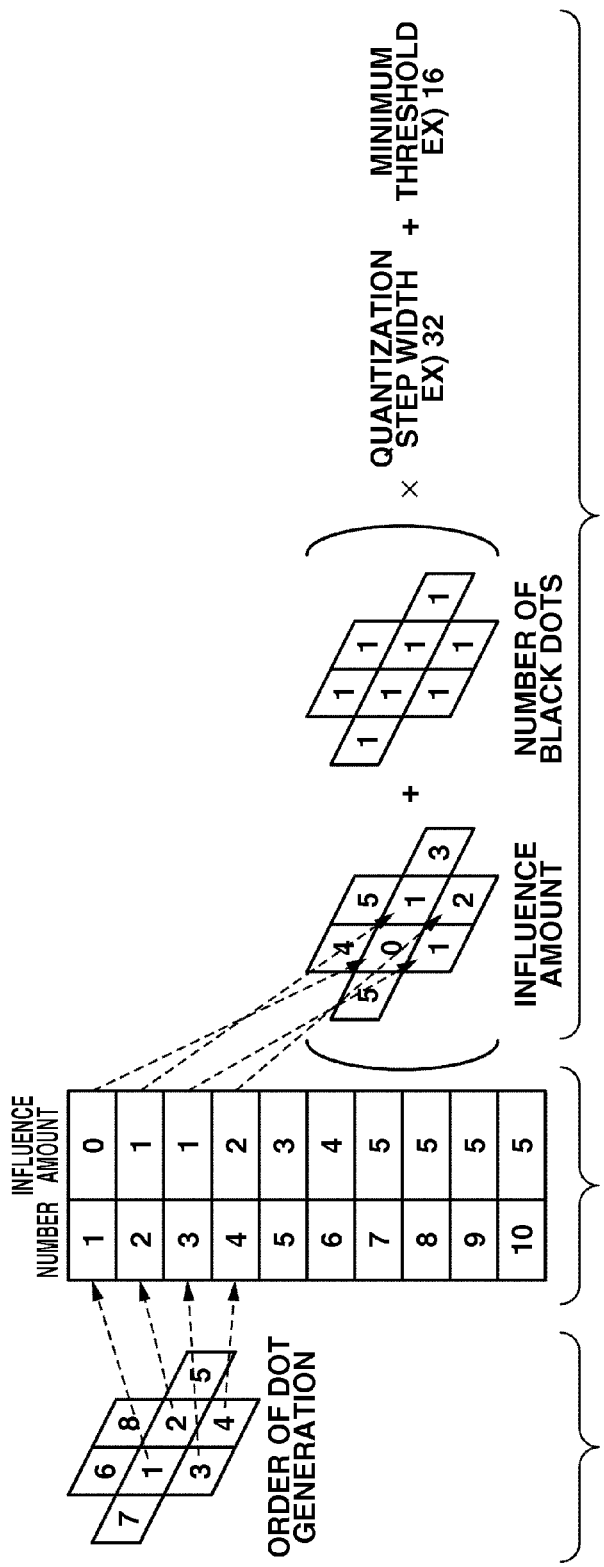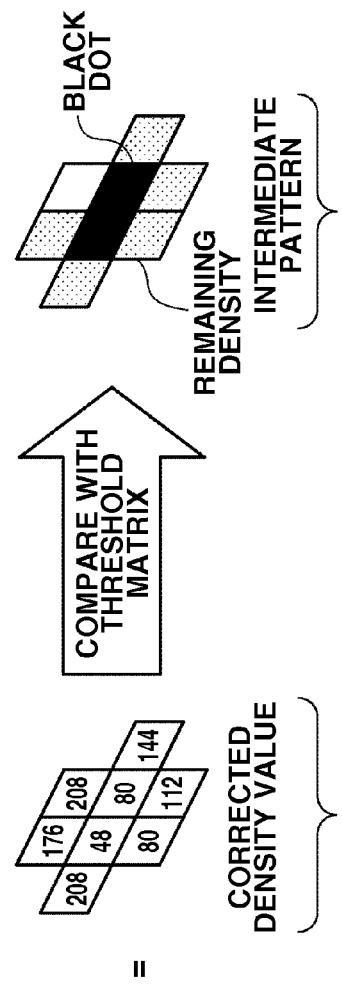

IMAGE PROCESSING APPARATUS, METHOD, AND PRODUCT FOR CONVERTING IMAGE DATA INTO FEWER GRADATIONS BASED ON TOTAL VALUE OF PIXELS IN A GROUP EXCEPT FOR A DETECTED PIXEL HAVING A SPECIFIC VALUE

BACKGROUND OF THE INVENTION

1. Field of the Invention

The present disclosure generally relates to image processing and, more particularly, to halftone processing for converting input image data into image data having fewer gradations.

2. Description of the Related Art

In recent years, printers are widely used to print images generated by computers, images captured by digital cameras, and images read by scanners. Image data handled by a computer typically has more gradations than a printer can output on a recording medium. Halftone processing is applied to digital image data to reduce the number of gradations so that an output apparatus such as a printer can output the gradations.

One of the known methods for halftone processing is expressing pseudo gradations in each unit area (cell). As a method for expressing pseudo gradations cell by cell, Japanese Patent Application Laid-Open No. 2007-194904 discusses a technique for calculating a barycentric position in each cell of point symmetric shape based on the pixel values of pixels corresponding to the cell, and growing dots from the barycentric position.

Japanese Patent Application Laid-Open No. 2007-82090 discusses a method for simply outputting the pixel values of pixels in a unit area if the unit area includes only white pixels and/or black pixels. If not, an average of the pixel values of the pixels in the unit area is output as the output values of the respective pixels.

According to the technique discussed in Japanese Patent Application Laid-Open No. 2007-194904, if a cell includes a plurality of edges or thin lines, the barycentric position of the dots may shift to one side and fail to be set in an appropriate position. In such a case, the resulting image has low resolution due to blurred edges or thin lines.

According to the technique discussed in Japanese Patent Application Laid-Open No. 2007-82090, a unit area may include a pixel having a pixel value expressing a halftone other than white and black pixels. Even if such a unit area includes an edge, the edge will not be detected. As a result, averaged data is output with a drop in resolution.

SUMMARY OF THE INVENTION

The present disclosure is directed to providing a method for obtaining favorable image data while preserving resolution by image processing for converting input image data into image data expressing pseudo gradations in each unit area.

According to an aspect of the present disclosure, an image processing apparatus capable of converting input image data into image data expressing a dot pattern cell by cell includes a detection unit configured to detect a pixel having a specific pixel value in the input image data, and a determination unit configured to determine an output value of a pixel included in each cell by arranging as many print pixels as a number of print pixels according to a total value of pixel values of a pixel group including pixels included in a cell except the pixel detected by the detection unit on any of the pixels in the pixel group cell by cell.

Further features and aspects of the present disclosure will become apparent from the following detailed description of exemplary embodiments with reference to the attached drawings.

BRIEF DESCRIPTION OF THE DRAWINGS

FIG. 5 is a diagram illustrating an example of order of selection for selecting black pixels.

FIGS. 9A, 9B, 9C, and 9D are diagrams respectively illustrating an influence amount table.

FIG. 16 is a diagram illustrating an example of a threshold matrix.

FIGS. 18A, 18B, 18C, 18D, and 18E are diagrams conceptually illustrating a result of the intermediate pattern generation processing.

DESCRIPTION OF THE EMBODIMENTS

Various exemplary embodiments, features, and aspects of the disclosure will be described in detail below with reference to the drawings. Note that the configurations described in the following exemplary embodiments are just a few examples, and exemplary embodiments of the present disclosure are not limited to the illustrated configurations.

Figure 1:
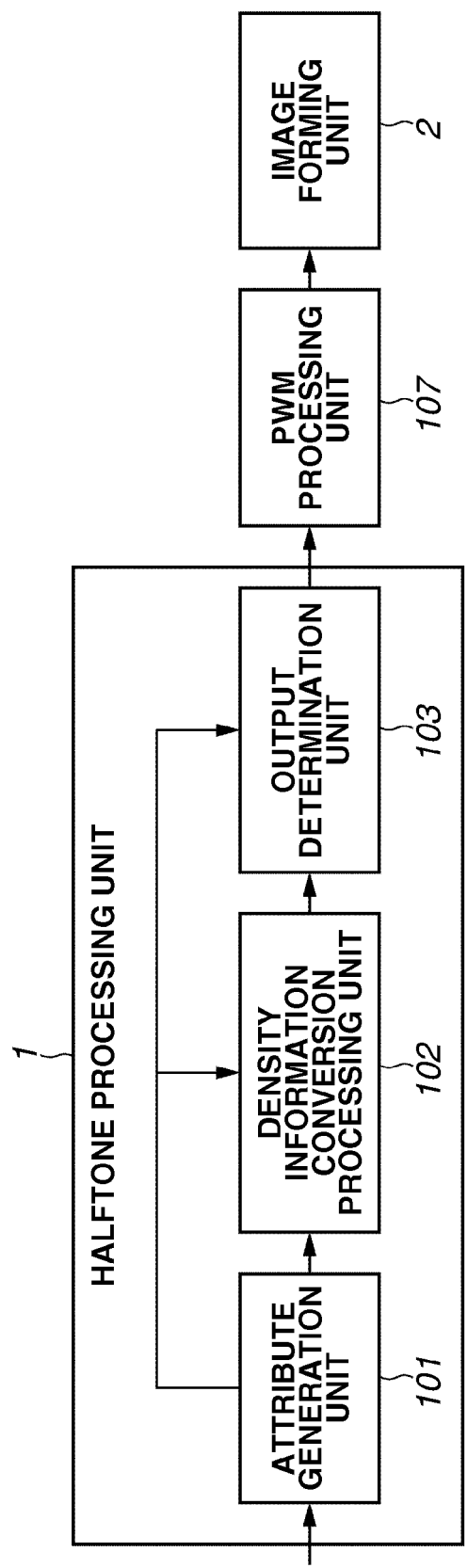
FIG. 1 is a block diagram illustrating a configuration of a halftone processing unit.

FIG. 1 is a block diagram illustrating a configuration of a halftone processing unit 1 and an image forming unit 2 which are applicable to the present exemplary embodiment. The halftone processing unit 1 converts input image data having 256 gradations into output image data having fewer gradations. Various types of image processing such as gamma correction have been applied to the input image data by a not-illustrated image processing unit. The image forming unit 2 forms an image on a recording medium based on the output image data received from the halftone processing unit 1. In FIG. 1, the halftone processing unit 1 and the image forming unit 2 are connected by an interface or a circuit. For example, the halftone processing unit 1 is implemented as a printer driver installed in a typical personal computer, along with various image processing units (not-illustrated). In such a case, the components of the halftone processing unit 1 described below are implemented by the personal computer executing a predetermined program or programs. The halftone processing unit 1 may be built in the image forming unit 2 side. As used herein, the term "unit" generally refers to any combination of software, firmware, hardware, or other component that is used to effectuate a purpose.

Figure 5:
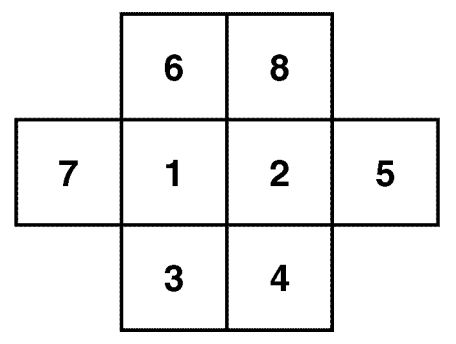

The halftone processing unit 1 includes an attribute generation unit 101, a density information conversion processing unit 102, and an output determination unit 103. The input image data input to the halftone processing unit 1 is image data corresponding to a monochromatic black color material that the image forming unit 2 has. The input image data contains any one of pixel values from 0 to 255 for each pixel. The minimum value of 0 represents a white pixel. The maximum value of 255 represents a black pixel. The input image data is processed in unit areas (cells). FIG. 5 illustrates a cell including eight pixels, which is used as a unit area in the present exemplary embodiment. Cells are closely allocated over the input image data in a tile-like configuration. The halftone processing unit 1 performs halftone processing on the input image data in units of such regularly sectioned cells.

The attribute generation unit 101 determines an attribute of the pixel value of each pixel in a cell of the input image data by using reference values, and generates attribute information for identifying the attribute. In the present exemplary embodiment, the attribute generation unit 101 generates any one of a white attribute, a black attribute, and a half gradation attribute as the attribute information, and adds the attribute information to each pixel. The white attribute indicates that the pixel is a white pixel. The black attribute indicates that the pixel is a black pixel. The half gradation attribute indicates that the pixel is neither a white pixel nor a black pixel. The reference value of the pixel value representing a white pixel is set to 0. The reference value of the pixel value representing a black pixel is set to 255.

The density information conversion processing unit 102 determines a total value of the pixel values (gradation values) of pixels having the half gradation attribute, and determines the number of black dots (the number of print pixels) corresponding to the cell based on the total value.

The output determination unit 103 determines the output values of the respective pixels in the cell to be processed based on the attribute information added to each pixel by the attribute generation unit 101 and the number of black dots obtained from the density information conversion processing unit 102. In the present exemplary embodiment, for pixels having the white attribute and the black attribute, the output determination unit 103 outputs output values corresponding to their respective attributes. If a pixel has the white attribute, the output determination unit 103 outputs an output value of 0. If a pixel has the black attribute, the output determination unit 103 outputs an output value of 255. In other words, for white pixels (white attribute) and black pixels (black attribute), the output determination unit 103 simply outputs the pixel values. If a plurality of pixels has the half gradation attribute, the output determination unit 103 outputs 255s (black dots) as many as the number of black dots according to predetermined order of dot generation. If there is a remaining density to be described below, the output determination unit 103 outputs the remaining density as the output value of a pixel that is the (number of black dots+1)-th or a subsequent one in the order of dot generation and has the half gradation attribute. The output determination unit 103 outputs 0s (white dots) for pixels that are not generated as a black or halftone dot. The order of dot generation is determined in advance as illustrated in FIG. 5 and retained in a retaining unit (not illustrated). According to the order of dot generation illustrated in FIG. 5, the output determination unit 103 generates black dots in order from pixels lying in the center of the cell area. This enables processing equivalent to halftone dot (amplitude modulation (AM) screen) dither processing for growing black dots from the center. As a result, a halftone image of stabler shape can be formed if the image forming unit 2 is an electrophotographic one. More specifically, the output determination unit 103 selects three types of dot values including 0 (white dot), 255 (black dot), and a remaining density (halftone dot) as the output values of each cell. Suppose that the output determination unit 103 outputs halftone dots in five values (0, 64, 128, 192, and 255). In such a case, the output image data can be said to be data obtained by substantially reducing the gradations of the input image data expressed in 255 values down to five values.

A pulse width modulation (PWM) processing unit 107 applies pulse width modulation to the output data output from the output determination unit 103 to generate a drive signal. The pulse width modulation is intended for the electrophotographic image forming unit 2 to form an image from the data of reduced gradations. If the reduced gradations include the foregoing five values, five pulse widths (0, 1, 2, 3, and 4) per pixel correspond to the five values.

Based on the drive signal, the image forming unit 2 exposes a photosensitive drum to laser to form an electrostatic latent image. A developing device develops the electrostatic latent image on the photosensitive drum into a toner image, which is recorded on a recording medium as an image through a transfer device.

Figure 2:
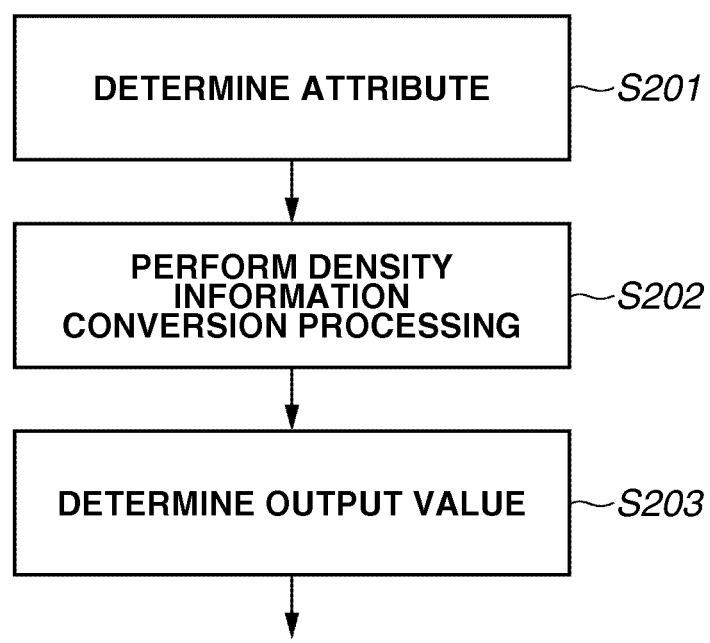
FIG. 2 is a diagram illustrating a flowchart of processing performed by the halftone processing unit.

FIG. 2 is a flowchart illustrating processing performed by the halftone processing unit 1. In step S201, the halftone processing unit 1 determines the attribute of each pixel constituting the input image data. If a pixel of the input image data has a pixel value of 0, the halftone processing unit 1 adds the attribute information indicating the white attribute to the pixel. If a pixel has a pixel value of 255, the halftone processing unit 1 adds the attribute information indicating the black attribute to the pixel. If a pixel has a pixel value other than 0 and 255, i.e., 1 to 254, the halftone processing unit 1 adds the attribute information indicating the half gradation attribute to the pixel.

Figure 4:
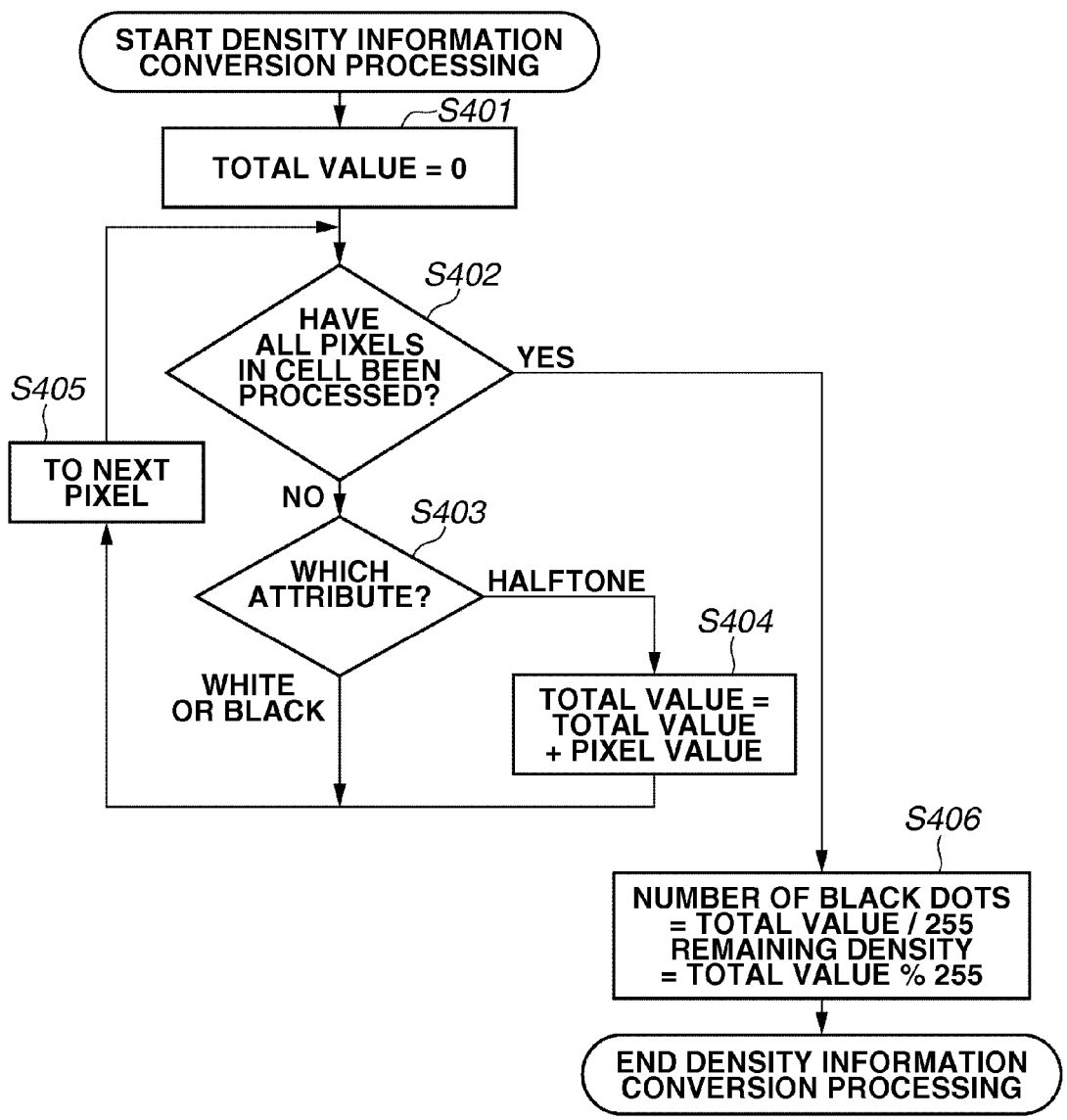
FIG. 4 is a diagram illustrating a flowchart of density information conversion processing.

In step S202, the halftone processing unit 1 performs density information conversion processing. FIG. 4 is a flowchart illustrating the density information conversion processing in detail. In step S401, the density information conversion processing unit 102 sets a total value to an initial value (0). In step S402, the density information conversion processing unit 102 determines whether all the pixels in a cell have been processed. If all the pixels in the cell have not been processed (NO in step S402), the density information conversion processing unit 102 proceeds to step S403 to calculate the total value because the total value is yet to be calculated. If all the pixels in the cell have been processed (YES in step S402), the density information conversion processing 102 proceeds to step S406 because the total value has been calculated. In step S403, the density information conversion processing unit 102 refers to the attribute information about a pixel of interest. If the attribute information indicates the white attribute or the black attribute (WHITE OR BLACK in step S403), the density information conversion processing unit 102 proceeds to step S405 not to include the pixel value of the pixel of interest into the total value. If the attribute information indicates the half gradation attribute (HALFTONE in step S403), the density information conversion processing unit 102 proceeds to step S404. In step S404, the density information conversion processing unit 102 adds the pixel value of the pixel of interest to the total value. Such processing is repeated to calculate the total value of the pixel values of a pixel group having the half gradation attribute.

In step S406, the density information conversion processing unit 102 calculates the number of black dots from the total value of the pixel values of the pixel group having the half gradation attribute. The number of black dots indicates how many pixels of the image group to be output as black dots. The density information conversion processing unit 102 divides the total value of the pixel values of the pixel group having the half gradation attribute by the pixel value (255) of a black dot, and outputs the quotient as the number of black dots. The density information conversion processing unit 102 further outputs the remainder of the total value divided by the pixel value (255) of a black dot as the remaining density.

The density information conversion by the density information conversion processing unit 102 is thus completed.

Figure 6:
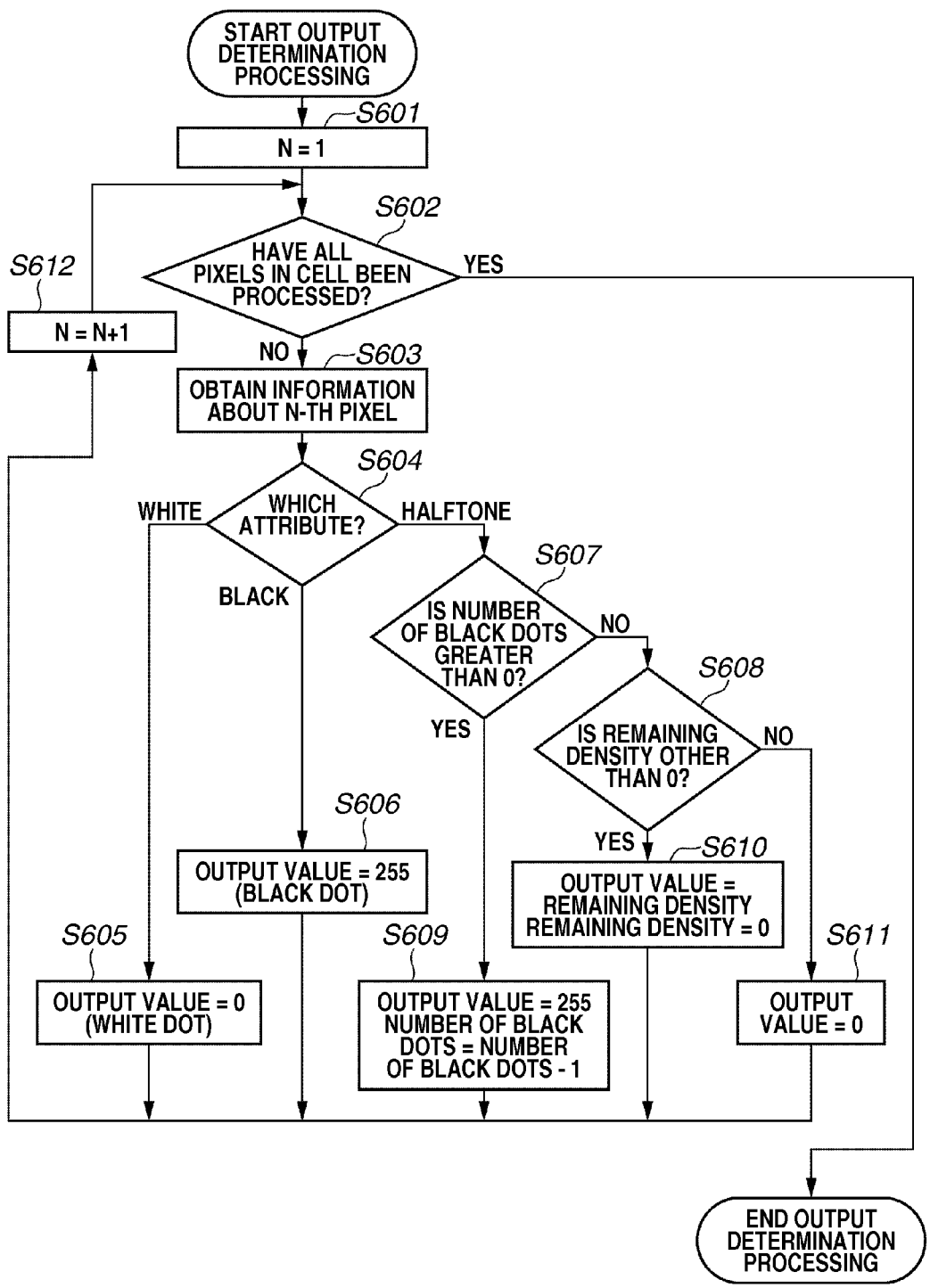
FIG. 6 is a diagram illustrating a flowchart of output determination processing.

Return to FIG. 2. In step S203, the halftone processing unit 1 determines the output value of each pixel in the cell to be processed. FIG. 6 is a diagram illustrating a detailed flowchart of output determination processing according to the present exemplary embodiment. In step S601, the output determination unit 103 sets a processing number N to 1. The processing number N is intended to perform processing in the order of dot generation determined in FIG. 5. In step S602, the output determination unit 103 determines whether all the pixels in the cell have been processed. If all the pixels in the cell have been processed (YES in step S602), the output determination unit 103 ends the output determination processing. If not (NO in step S602), the output determination unit 103 proceeds to step S603 to start processing the N-th pixel.

In step S604, the output determination unit 103 determines the attribute of the N-th pixel to be processed. If the N-th pixel has the white attribute (WHITE in step S604), the output determination unit 103 proceeds to step S605. In step S605, the output determination unit 103 sets the output value of the N-th pixel to 0 (white dot). If the N-th pixel has the black attribute (BLACK in step S604), the output determination unit 103 proceeds to step S606. In step S606, the output determination unit 103 sets the pixel value of the N-th pixel to 255 (black dot). If the N-th pixel has the half gradation attribute (HALFTONE in step S604), the output determination unit 103 proceeds to step S607 to determine the output value based on the number of black dots. If the number of black dots at the time of the processing of the N-th pixel is greater than 0 (YES in step S607), the output determination unit 103 proceeds to step S609. In step S609, the output determination unit 103 sets the output value of the N-th pixel to 255, and subtracts 1 from the number of black dots to determine the new number of black dots. If the number of black dots is zero (NO in step S607), the output determination unit 103 proceeds to step S608. In step S608, if the remaining density is other than zero (YES in step S608), the output determination unit 103 proceeds to step S610. In step S610, the output determination unit 103 sets the remaining density as the output value of the pixel of interest, and sets the new remaining density to 0. If the remaining density is already 0 (NO in step S608), the output determination unit 103 proceeds to step S611. In step S611, the output determination unit 103 sets the output value of the pixel of interest to 0 (white dot). In step S612, the output determination unit 103 adds 1 to N to advance the processing to the next pixel. The above is the output determination processing.

An example of the result of such processing will be described with reference to FIGS. 3A, 3B, and 3D. FIG. 3A illustrates an example of a cell constituting the input image data. FIG. 3B illustrates the result of the attribute determination based on the pixel values (gradation values) of the pixels. B represents the black attribute, W the white attribute, and H the half gradation attribute. FIG. 3D illustrates the result of the output determination processing. The pixels having a pixel value of 255 in the input image data illustrated in FIG. 3A are output as black dots (print pixels) without exception. The pixels having a pixel value of 0 are output as white dots (non-print pixels) without exception. The total of the pixel values of the three pixels determined to have the half gradation attribute is 287. The number of black dots is the quotient of 287 divided by 255, i.e., 1. The remaining density is the remainder, 32. Note that the method for determining the number of black dots and the remaining density is not limited thereto. A table containing the numbers of black dots and remaining densities corresponding to respective total values may be consulted to determine the number of black dots and the remaining density. In the present exemplary embodiment, the remaining density of 32 is converted into a minimum pulse width of 1 by the PWM processing.

As described above, in the present exemplary embodiment, the white pixels having a pixel value of 0 represent white dots (output value of 0) in the output image data. In other words, the pixels having a pixel value of 0 indicate pixel positions where no black dot is generated. The halftone processing unit 1 performs processing so that the white pixels have an output value of 0. The black pixels having a pixel value of 255 correspond to black dots (print pixels) in the output image data. The black pixels indicate pixel positions where black dots should be generated in the output image data. The halftone processing unit 1 performs processing so that the black pixels have an output value of 255 indicating a black dot. The pixels of the input image data corresponding to neither a white dot nor a black dot have the half gradation attribute. As for the pixels having the half gradation attribute, the halftone processing unit 1 determines the number of black dots based on the total of the pixel values of the halftone pixel group, and then determines the position(s) of the black dot(s) according to the predetermined order of dot generation.

As described above, according to the present exemplary embodiment, the halftone processing unit 1 can obtain a halftone processing result with suppressed density variations while preserving edges and thin lines of the image. In general, dither processing for expressing gradations cell by cell can cause a moire pattern due to the interference of the period of a threshold matrix with that of the input image data. Unevenness called jaggy can also occur on edges. In the present exemplary embodiment, black pixels/white pixels are output as black dots/white dots, respectively. This preserves the resolution of the black pixels and the white pixels. Dots arranged on the black pixels/white pixels are moved to and output at the positions of pixels having the half gradation attribute, whereby the density of the cell is preserved. This suppresses the occurrence of jaggy on edges and the interference with the input image data.

In the present exemplary embodiment, the remaining density not reaching a black dot is reproduced by the subsequent PWM processing. However, some image forming units form an image by either forming a dot (black dot) or not (white dot). In such a case, the remaining density may be rounded off (a black dot if the remaining density is higher than or equal to 128; a white dot otherwise). Alternatively, a threshold matrix (table) to be searched cell by cell may be provided to dither the remaining density. Such a configuration can provide generally the same effects as those of the present exemplary embodiment. In such a case, the output determination unit 103 may generate one-bit output image data by outputting an output value of 1 for black dots and an output value of 0 for white dots.

The foregoing exemplary embodiment has dealt with the case where the cells to be determined whether to generate white/black dots (first unit areas) and the cells to maintain the order of dot generation (second unit areas) are the same. However, the first unit areas and the second unit areas may have different sizes. In such a case, it is desirable that the first unit areas is greater than the second unit areas, and that the first unit areas is set so that the second unit areas all include the same number of numbers in the order of dot generation.

The foregoing exemplary embodiment has dealt with the configuration where a dot-concentrated (AM screen) output image can be obtained. When using an AM screen, the cells can be set in units of the halftone dots of the AM screen. This can preserve a halftone dot structure of the AM screen. However, the use of the AM screen is not restrictive. For example, the order of dot generation may be set to provide a Bayer pattern or a blue noise characteristic. This enables applications to a dot-distributed frequency modulation (FM) screen or a blue noise mask.

The present exemplary embodiment has described the mode in which the attribute determination is performed to add information indicating an attribute to each pixel. However, if the output is determined in the order of dot generation as illustrated in FIG. 6, the attribute information need not be added in advance.

The foregoing first exemplary embodiment has described the mode in which the output values are determined in the order of dot generation. The present second exemplary embodiment describes a mode in which the output values of the pixels are determined based on calculations of the amounts of influence that the presence of black/white pixels has on the dot output of pixels having the half gradation attribute. Similar components to those of the first exemplary embodiment will be designated by the same reference numerals. A description thereof will be omitted.

Figure 7:
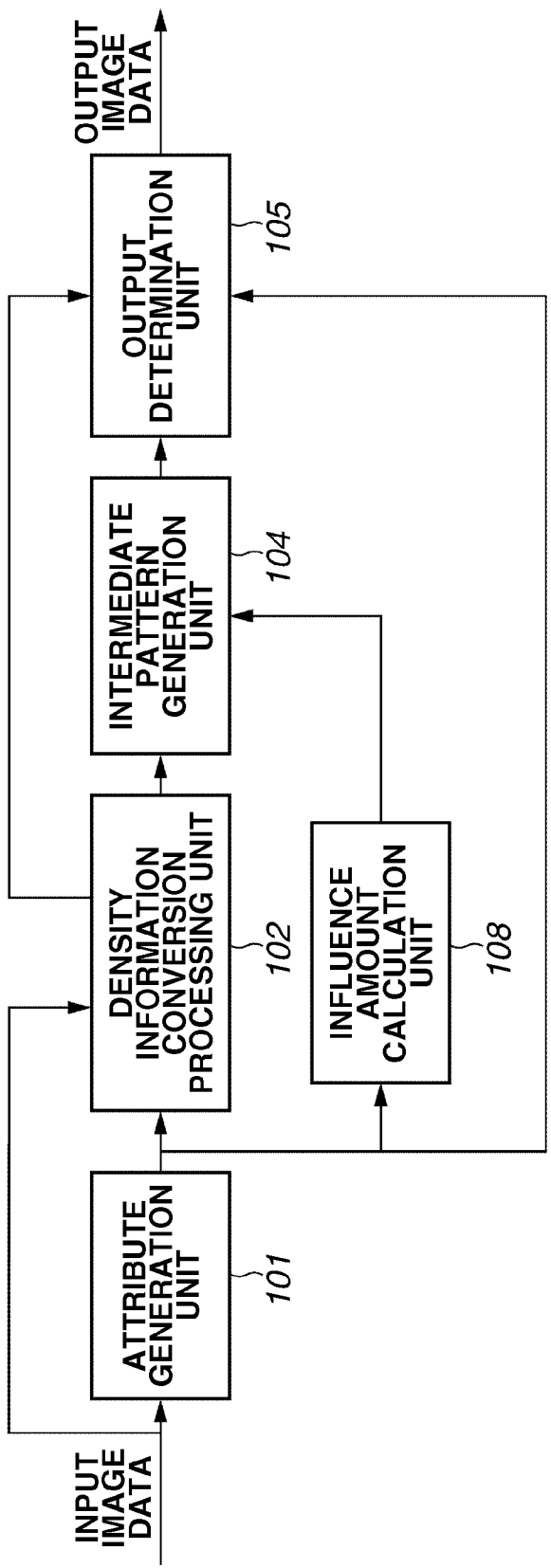
FIG. 7 is a block diagram illustrating a configuration of a halftone processing unit.

FIG. 7 is a block diagram illustrating a configuration of a halftone processing unit applicable to the second exemplary embodiment. An influence amount calculation unit 108 generates an influence amount table which shows the amounts of influence that the pixels preserving the resolution of the input image data have on the number of black dots determined in advance. Like the first exemplary embodiment, a not-illustrated dot generation order retaining unit retains the order of dot generation illustrated in FIG. 5.

An intermediate pattern generation unit 104 generates an intermediate pattern by using the number of black dots and the remaining density calculated by the density information conversion unit 102 and the influence amount table calculated by the influence amount calculation unit 108. The intermediate pattern is intended to reproduce the density of a pixel group having the half gradation attribute. To take a simple example, suppose that all the pixels in a cell have the half gradation attribute, and the total density of the cell is as much as to generate four black dots and a remaining density. In such a case, the four black dots can arranged in the order of dot generation and the remaining density on the fifth dot in the order of dot generation to complete the intermediate pattern.

Figure 3:
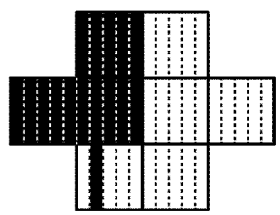
FIGS. 3A, 3B, 3C, 3D, and 3E are diagrams illustrating an example of halftone processing.

If the cell includes pixels having the white/black attributes like FIG. 3, the black dots and the remaining density need to be arranged to avoid the pixels having the white or black attributes. Otherwise, the black dots cannot be arranged in consideration of the white/black attributes. For example, the intermediate pattern generation unit 104 may refer to the attributes in the order of dot generation and successively arrange the black dots on the pixels having the half gradation attribute without arranging the black dots on the pixels having the white or black attributes. After as many black dots as determined by the density information conversion unit 102 are arranged, the intermediate pattern generation unit 104 arranges the remaining density. By such a method, the intermediate pattern generation unit 104 can preserve the density of the pixels having the half gradation attribute in consideration of the positions of the pixels having the white or black attributes. In other words, if a pixel of interest has the white or black attribute, the intermediate pattern generation unit 104 shifts and arranges the black dots and the remaining density to the subsequent pixels in the order of dot generation. In such a manner, the intermediate pattern generation unit 104 can preserve the density in consideration of the positions of the white and black attributes. Note that the order of dot generation depends on a screen angle and whether the screen is an AM screen or an FM screen. Since the order of pixels to be referred to varies with the order of dot generation, such a method is not suitable for hardware implementation. In the present exemplary embodiment, the foregoing shift of the black dots and the remaining density is therefore determined in advance as the amounts influence of the pixels having the white or black attributes. As a result, the intermediate pattern generation unit 104 can always generate an intermediate pattern in consideration of the influence of the white or black attributes by the same order of processing regardless of the order of dot generation.

An output determination unit 105 combines the intermediate pattern output from the intermediate pattern generation unit 104 with black/white pixels indicated by the attribute information based on the attribute information. The output determination unit 105 thereby determines the output values of the respective pixels in the cell to generate output image data. Specifically, the output determination unit 105 sets the output values of pixels having the white attribute and the black attribute to white and black dots, respectively. The output determination unit 105 sets the output values of pixels having the half gradation attribute to the result of the intermediate pattern. The output image data is usually converted into fewer gradations than the input image data has.

Figure 8:
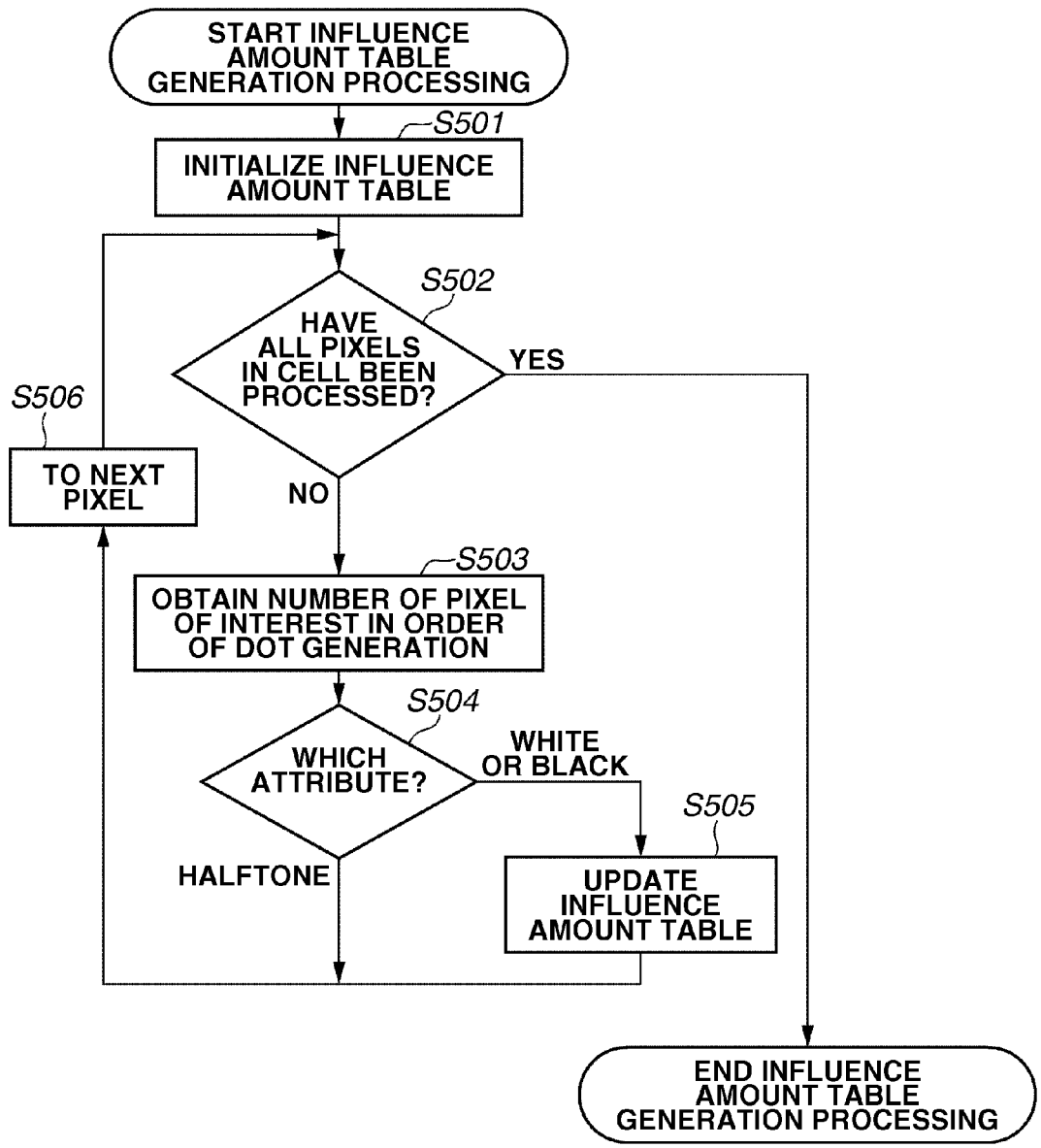
FIG. 8 is a diagram illustrating a flowchart of influence amount table generation processing.

A procedure for influence amount table generation processing will be described. FIG. 8 illustrates a flowchart of the influence amount table generation processing performed by the influence amount calculation unit 108. The influence amount calculation unit 108 performs the influence amount table processing according to the present exemplary embodiment on the input image data in raster order. In terms of the numbers in the order of selection illustrated in FIG. 5, the pixels in a cell are processed in order of 6, 8, 7, 1, 2, 5, 3, and 4. FIGS. 9A to 9D illustrate a process of generating an influence amount table for the input image data of FIG. 3A. In the illustrated example, the influence amount table can handle up to ten pixels in a cell (in the present exemplary embodiment, rows Nos. 9 and 10 are unused). In step S501, the influence amount calculation unit 108 sets all the amounts of influence in the influence amount table to 0 for initialization (FIG. 9A). In step S502, the influence amount calculation unit 108 checks whether all the pixels in the cell have been processed. If all the pixels have been processed (YES in step S502), the influence amount calculation unit 108 ends the generation of the influence amount table. If there is an unprocessed pixel (NO in step S502), the influence amount calculation unit 108 proceeds to step S503.

In step S503, the influence amount calculation unit 108 checks what number the pixel to be processed is in the order of dot generation, and obtains the number in the order of dot generation. In step S504, the influence amount calculation unit 108 determines which attribute the pixel of interest has, the white attribute, the black attribute, or the half gradation attribute. If the pixel of interest has the half gradation attribute (HALFGRADATION in step S504), the influence amount calculation unit 108 proceeds to step S506 to move the processing to the next pixel. In other words, if the pixel of interest has the half gradation attribute, the amounts of influence remain unchanged. If the pixel of interest has the white attribute or the black attribute (WHITE OR BLACK in step S504), the influence amount calculation unit 108 proceeds to step S505. In step S505, the influence amount calculation unit 108 updates the influence amount table by adding 1 to each of the amounts of influence at the number of the pixel of interest and the subsequent numbers in the order of dot generation. For example, in the case of the input image data illustrated in FIG. 3A, the sixth pixel in the order of dot generation is the first to be processed. Since the sixth pixel has the black attribute, the influence amount calculation unit 108 adds 1 to each of the sixth and subsequent amounts of influence in the influence amount table (FIG. 9B). The eighth pixel is the next to be processed. Since the eighth pixel has the half gradation attribute, the influence amount calculation unit 108 does not update the influence amount table. The seventh pixel in the order of dot generation is the next to be processed. Since the seventh pixel has the black attribute, the influence amount calculation unit 108 adds 1 to each of the seventh and subsequent amounts of influence in the influence amount table (FIG. 9C).

By such processing, the influence amount calculation unit 108 generates the influence amount table (FIG. 9D). The amount of influence corresponding to each number indicates how many pixels there are to generate output values according to the attributes (black/white pixels) before the pixel of that number, including the pixel of interest. For example, the influence amount table illustrated in FIG. 9D shows that the cell to be processed (FIG. 3A) includes five black/white pixels before the pixel corresponding to No. 7 in the order of dot generation, including the pixel corresponding to No. 7 itself, when counted in order from the pixel corresponding to No. 1.

Figure 10:
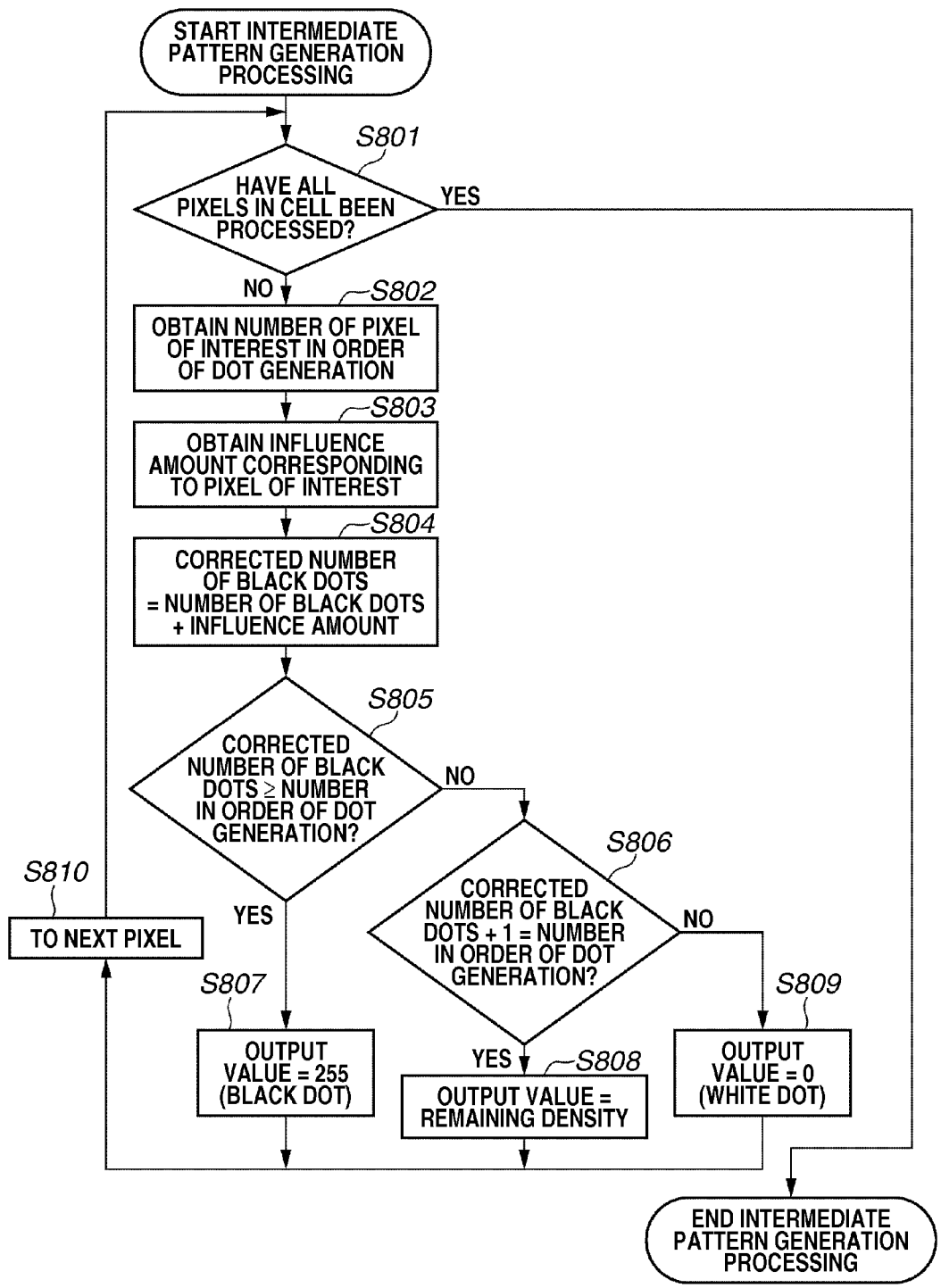
FIG. 10 is a diagram illustrating a flowchart of intermediate pattern generation processing.

A procedure for intermediate pattern generation processing performed by the intermediate pattern generation unit 104 will be described. FIG. 10 illustrates a flowchart of the intermediate pattern generation processing. FIGS. 11A to 11E are diagrams conceptually illustrating a process of generating an intermediate pattern. The intermediate pattern generation unit 104 refers to the pixels in the cell in raster order.

Figures 11A, 11B, 11C:
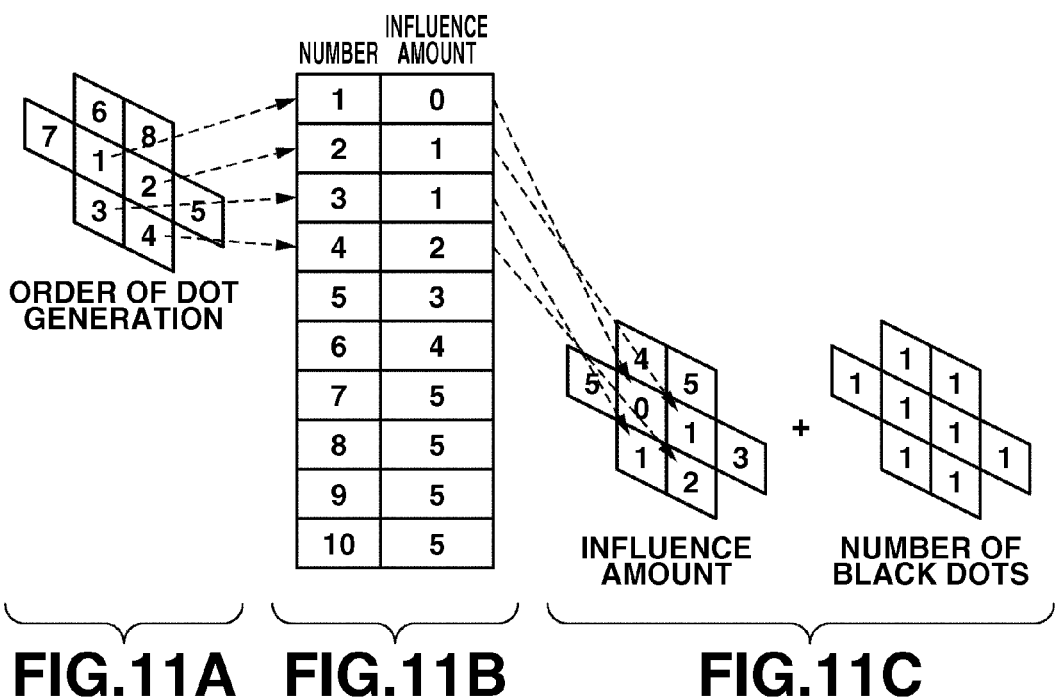
FIGS. 11A, 11B, 11C, 11D, and 11E are diagrams conceptually illustrating a result of the intermediate pattern generation processing.

In step S801, the intermediate pattern generation unit 104 determines whether all the pixels in the cell have been processed. If all the pixels have been processed (YES in step S801), the intermediate pattern generation unit 104 ends the intermediate pattern generation processing. If not (NO in step S801), the intermediate pattern generation unit 104 proceeds to step S802. In step S802, the intermediate pattern generation unit 104 checks what number the pixel to be processed is in the order of dot generation, and obtains the number (FIG. 11A). The number of dot generation used here is the same as that used by the influence amount calculation unit 108.

Figures 11D, 11E:
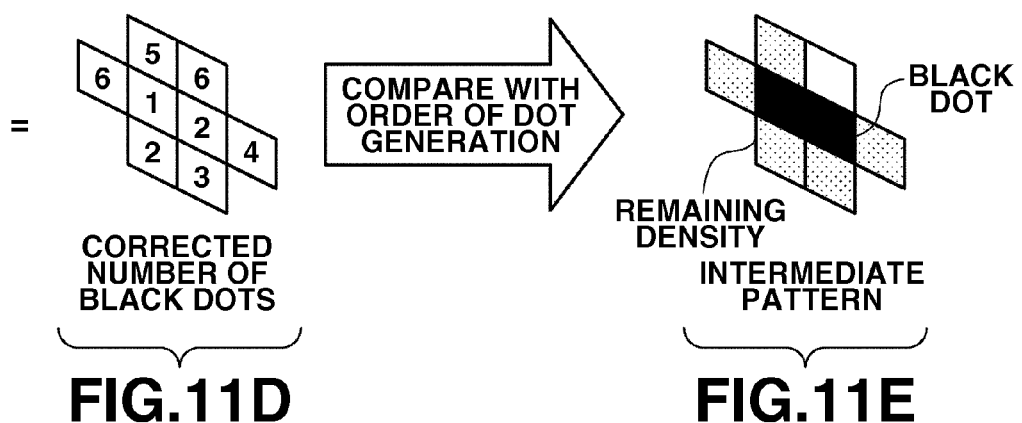

In step S803, the intermediate pattern generation unit 104 obtains the amount of influence corresponding to the pixel of interest from the influence amount table (FIG. 11B). In step S804, the intermediate pattern generation unit 104 adds the number of black dots obtained from the density information conversion processing unit 102 and the amount of influence (FIG. 11C). The sum is the corrected number of black dots of the pixel (FIG. 11D). The operation of step S804 will be described in detail. The number of black dots indicates the number of black dots to be formed in pixels having the half gradation attribute. A black dot is always generated in each position where the order of dot generation is smaller than or equal to the number of black dots. If the cell includes a pixel or pixels having the white/black attributes, the positions of the black dots and the remaining density need to be shifted as described above. To determine the amount of shift, the intermediate pattern generation unit 104 checks the amount of influence due to the pixel(s) having the white/black attributes. As described above, the amount of influence indicates how many pixels (black/white pixels) there are to replace output values in the subsequent processing according to the attributes before the pixel of interest, including the pixel of interest. In other words, the amount of influence indicates how many times dots are moved before the pixel of interest. The sum of the number of black dots and the amount of influence at the pixel of interest indicates the number of black dots equivalent to that when black dots are arranged on the pixels to replace output values according to the attributes before the pixel of interest. By comparing the corrected number of black dots with the order of dot generation in step S805 to determine whether the corrected number of black dots is greater than or equal to the order of dot generation, the intermediate pattern generation unit 104 can generate an intermediate dot pattern on which the amounts of influence of the white/black attributes are reflected, i.e., on which the dot shift due to the pixels having the white/black attributes is reflected.

In step S805, the intermediate pattern generation unit 104 determines whether the corrected number of black dots calculated in step S804 is greater than or equal to the number in the order of dot generation obtained in step S802. If the corrected number of black dots is greater than or equal to the number in the order of dot generation (YES in step S805), the intermediate pattern generation unit 104 proceeds to step S807. In step S807, the intermediate pattern generation unit 104 sets the output value of the pixel of interest to 255 (black dot). If the corrected number of black dots is less than the number in the order of dot generation (NO in step S805), the intermediate pattern generation unit 104 proceeds to step S806.

In step S805, the intermediate pattern generation unit 104 determines the position of a black dot in consideration of the dot shift by referring to the amount of influence. When all the black dots have been arranged by reference in the order of dot generation, the intermediate pattern generation unit 104 arranges the remaining density in the position at the next number in the order of dot generation. If the pixel of the next number has the white or black attribute, a dot shift occurs even to the remaining density. The intermediate pattern generation unit 104 can determine the position of the remaining density in consideration of the dot shift by adding the amount of influence to the sum of the number of black dots and 1. In other words, the intermediate pattern generation unit 104 arranges the remaining density on the pixel where the sum of the number of black dots, 1, and the amount of influence coincides with the order of dot generation. In step S806, the intermediate pattern generation unit 104 therefore determines whether the sum of the corrected number of black dots and 1 is equal to the number of the order of dot generation of the pixel of interest. If the sum is equal to the number in the order of dot generation (YES in step S806), the intermediate pattern generation unit 104 proceeds to step S808. In step S808, the intermediate pattern generation unit 104 sets the remaining density calculated by the density information conversion processing unit 102 as the output value of the pixel of interest. If the number in the order of dot generation is different from the sum of the corrected number of black dots and 1 (NO in step S806), the intermediate pattern generation unit 104 proceeds to step S809. In step S809, the intermediate pattern generation unit 104 sets the output value of the pixel of interest to 0 (white dot). In step S810, the intermediate pattern generation unit 104 changes the pixel to be processed to an unprocessed pixel in the cell. In step S801, the intermediate pattern generation unit 104 determines again whether all the pixels in the cell have been processed. The intermediate pattern generation unit 104 repeats such processing on all the pixels in the cell to generate an intermediate pattern (FIG. 11E). The intermediate pattern generation unit 104 thereby completes the intermediate pattern generation processing.

FIG. 3C illustrates an intermediate pattern obtained by the intermediate pattern generation unit 104. Of the three pixels exhibiting the half gradation attribute, the pixel corresponding to No. 1 in the order of dot generation is output as a black dot. The output values of the pixels corresponding to Nos. 3 to 7 in the order of dot generation are set to the remaining density. The pixel corresponding to No. 2 in the order of dot generation is also output as a black dot. This black dot is output as a result of performing the processing for arranging black dots as many as obtained by the density information conversion processing unit 102 on the pixels having the half gradation attribute in consideration of the influence of the white or black attributes during the intermediate pattern generation processing. Note that the pixel No. 2 in the order of dot generation is to be replaced with the output value according to the attribute (in this example, 0) by the output determination unit 105 in the subsequent stage. The arrangement of the black dot thus causes no adverse effect. The pixels Nos. 4 to 7 in the order of dot generation are also to be replaced with the output values according to the attributes, and thus cause no adverse effect.

The output determination unit 105 determines the output values based on the attribute information indicating the attributes of the respective pixels, illustrated in FIG. 3B, and the intermediate pattern illustrated in FIG. 3C. FIG. 3D illustrates the result.

As described above, according to the present exemplary embodiment, the halftone processing unit can obtain a halftone processing result with suppressed variations in the cell density while preserving the resolution of the white/black pixels like the foregoing exemplary embodiment. A high quality image can thus be obtained while suppressing a moire pattern and disconnected thin lines. In the present exemplary embodiment, the output values are determined based on the corrected numbers of black dots on which the influence of the pixels of the input image data to preserve resolution (the pixels of the intermediate pattern to replace output values) is reflected. Such a configuration enables arranging dots in a cell in raster order. Even if a cell shape or the order of dot generation in the cell changes, the order in which for each of the processing units to refer to the pixels need not be changed. This can simplify the circuit configuration.

In the foregoing exemplary embodiments, the attributes of the input image data are handled with the reference value of 0 as the pixel value indicating the white attribute and the reference value of 255 (maximum value of the input image data) as the pixel value indicating the black attribute. Depending on the input image data, some pixels that are supposed to be white may have greater pixel values than 0 because of noise. The present third exemplary embodiment describes an exemplary embodiment for obtaining a high quality image even in such a case. Like the foregoing exemplary embodiments, the input image data is 8-bit data with possible pixel values of 0 to 255.

Figure 12:
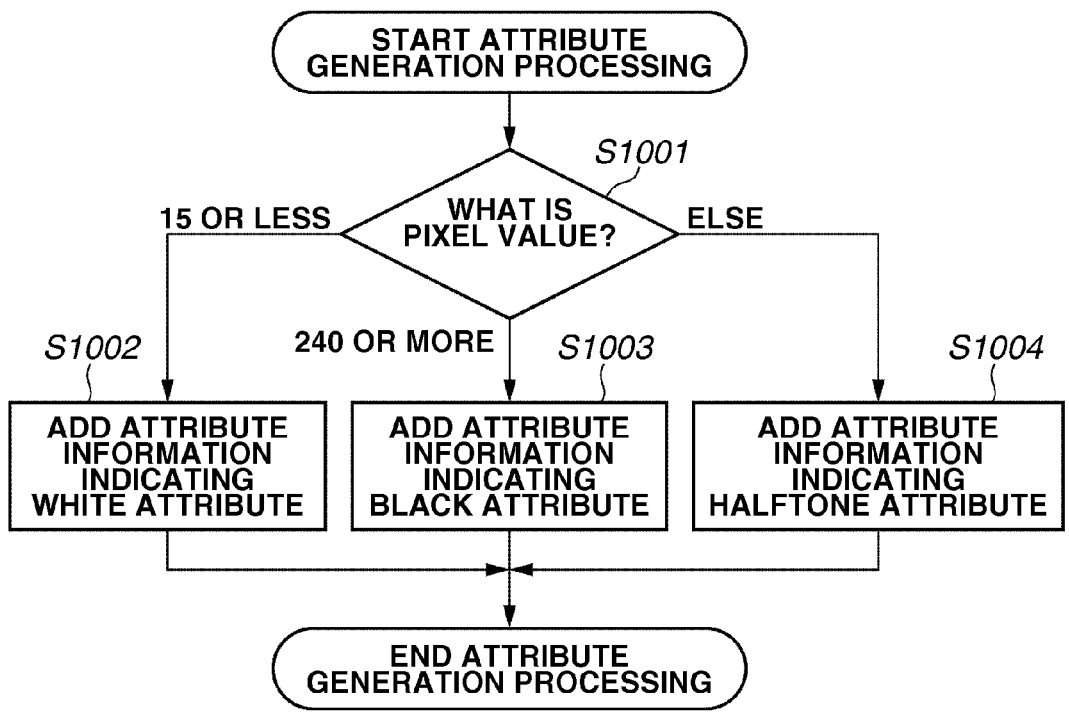
FIG. 12 is a diagram illustrating a flowchart of attribute generation processing.

FIG. 12 illustrates attribute determination according to the present exemplary embodiment.

In step S1001, like the first exemplary embodiment, the attribute generation processing unit 101 determines the pixel value (gradation value) of each pixel constituting the input image data. If the pixel value is near white (less than or equal to a reference value of 15; 15 OR LESS in step S1001), the attribute generation unit 101 determines that the pixel has the white attribute. Then in step S1002, the attribute generation unit 101 adds the attribute information indicating the white attribute to the pixel. If the pixel value is near the maximum value (greater than or equal to a reference value of 240; 240 OR MORE in step S1001), the attribute generation unit 101 determines that the pixel has the black attribute. Then in step S1003, the attribute generation unit 101 adds the attribute information indicating the black attribute to the pixel. For other pixel values (ELSE in step S1001), the attribute generation unit 101 determines that the pixel has the half gradation attribute. Then in step S1004, the attribute generation unit 101 adds the attribute information indicating the half gradation attribute to the pixel.

As described above, the attribute generation unit 101 determines low density pixels having near-white pixel values to have the white attribute, and high density pixels having near-black pixel values to have the black attribute. More specifically, pixel values of the input image data less than or equal to 15 are determined to represent white dots of the output image data. Pixel values greater than or equal to 240 are determined to represent black dots of the output image data. In such a manner, a halftone processing image can be obtained with suppressed density variations while preserving the resolution of the white/black pixels. In addition, pixels unnecessary for printing, like noise in a Joint Photographic Experts Group (JPEG) compressed image or a scanned image, can be removed. This can reduce noise and improve sharpness of characters/thin lines. The pixel values of the low density pixels to be determined to have the white attribute and those of the high density pixels to be determined to have the black attribute both can be set according to the magnitude of the mixed noise.

In the third exemplary embodiment, pixel values less than or equal to 15 are output as white (an output value of 0), and pixel values greater than or equal to 240 are output as black (an output value of 255). The pixel values of the pixels determined to have the white or black attribute are not reflected on the output image data. This somewhat decreases the gradation reproducibility of the output image data after the halftone processing. Such a decrease in the gradation reproducibility has little effect on the image quality as far as noise is concerned. Unreflected gradation components may express significant information like character bleeding or flat portions of light tones resulting from color separation into ink colors. In such a case, halftone processing in consideration of the unreflected gradation components can be performed to obtain an image that can more faithfully reproduce the gradations of the input image data. The present fourth exemplary embodiment describes a mode in which the pixels values (gradation values) of the pixels determined to have the white or black attributes are reflected on the output image data.

Figure 13:
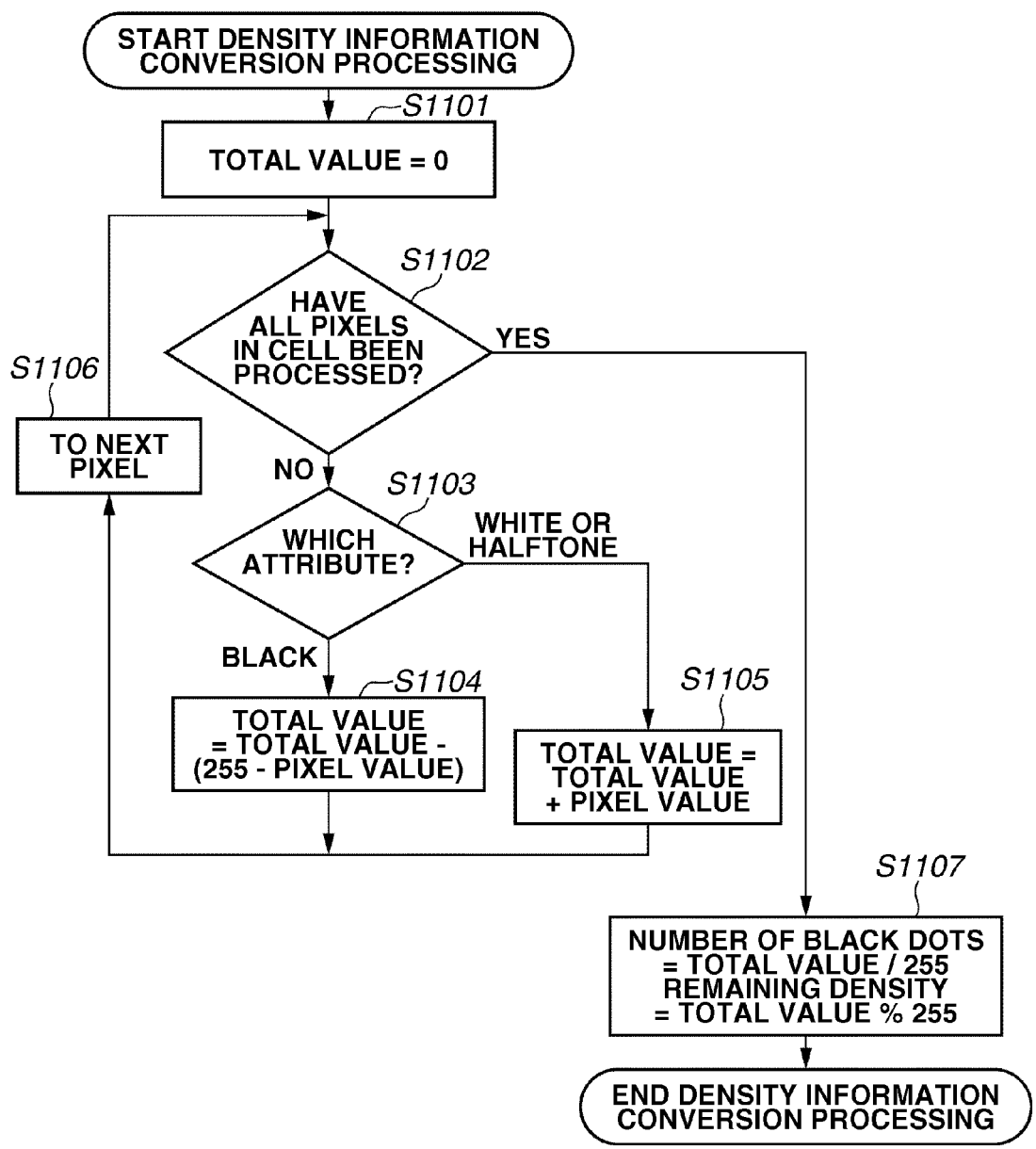
FIG. 13 is a diagram illustrating a flowchart of density information conversion processing.

FIG. 13 illustrates a flowchart of the density information conversion processing performed by the density information conversion processing unit 102 that is applicable to the fourth exemplary embodiment. For attribute determination, the attribute determination according to the third exemplary embodiment is performed. The density information conversion processing unit 102 according to the present exemplary embodiment differs from those of the foregoing exemplary embodiments in the operation of step S1104.

In step S1103, if the pixel of interest is determined to have the white attribute or the half gradation attribute (WHITE OR HALFTONE in step S1103), then in step S1105, the density information conversion processing unit 102 adds the pixel value of the pixel of interest to the total value. If the pixel of interest has the black attribute (BLACK in step S1103), then in step S1104, the density information conversion processing unit 102 subtracts the difference between the output value of 255 and the pixel value of the pixel of interest from the total value. This reflects the difference to occur when the pixel value of the black attribute is set to 255 on the total value. If the total value results in a negative value, the density information conversion processing unit 102 sets the total value to 0.

In step S1107, the determination information conversion processing unit 102 determines the number of black dots and the remaining density by using the total value calculated as described above. Consequently, the determination information conversion processing unit 102 can reflect on the output result of the cell errors occurring when pixels having a pixel value less than or equal to 15 are output as 0 and errors occurring when pixels having a pixel value greater than or equal to 240 are output as 255. For example, suppose that an image generated by scanning a text document includes bleeding of characters or thin lines. In such a case, the density of the bleeding, lightly-scanned pixels can be concentrated on the characters or the thin lines. As a result, the low-density characters or thin lines bleeding over the background improve in sharpness. Since the reproducibility of the low densities improves, the color reproducibility of flat portions improves as well.

Figure 14:
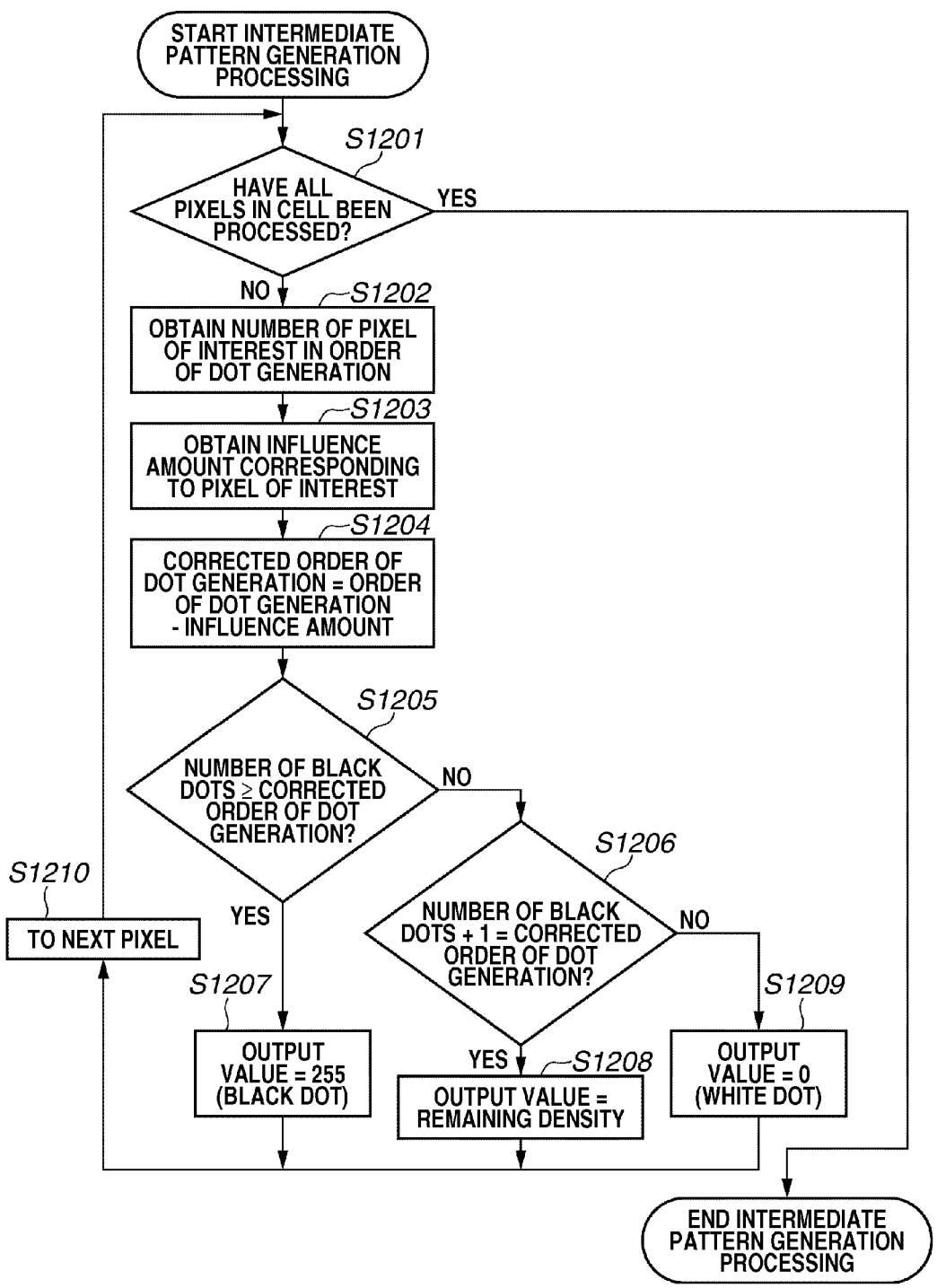
FIG. 14 is a diagram illustrating a flowchart of intermediate pattern generation processing.

In the second exemplary embodiment, the intermediate pattern is generated by comparing the sum of the amount of influence and the number of black dots with the order of dot generation. In other words, the intermediate pattern is generated by adding the amount of influence to the number of black dots to calculate the amount of shift of black dots relative to the order of dot generation. A fifth exemplary embodiment deals with a different configuration for generating a similar intermediate pattern, in which the intermediate pattern is generated by reflecting the amount of influence upon the order of dot generation. Black dots are generated by comparing the number of black dots with the order of dot generation, so that an intermediate pattern can be generated in consideration of the dot shift even by subtracting the amount of influence from the order of dot generation to generate the corrected order of dot generation and by comparing the corrected dot generation with the number of black dots. Hereinafter, description of components similar to those of the second exemplary embodiment will be omitted. FIG. 14 illustrates a flowchart of the intermediate pattern generation processing according to the present fifth exemplary embodiment. FIGS. 15A to 15E are diagrams conceptually illustrating the process of generating an intermediate pattern according to the fifth exemplary embodiment.

Figures 15A, 15B, 15C:
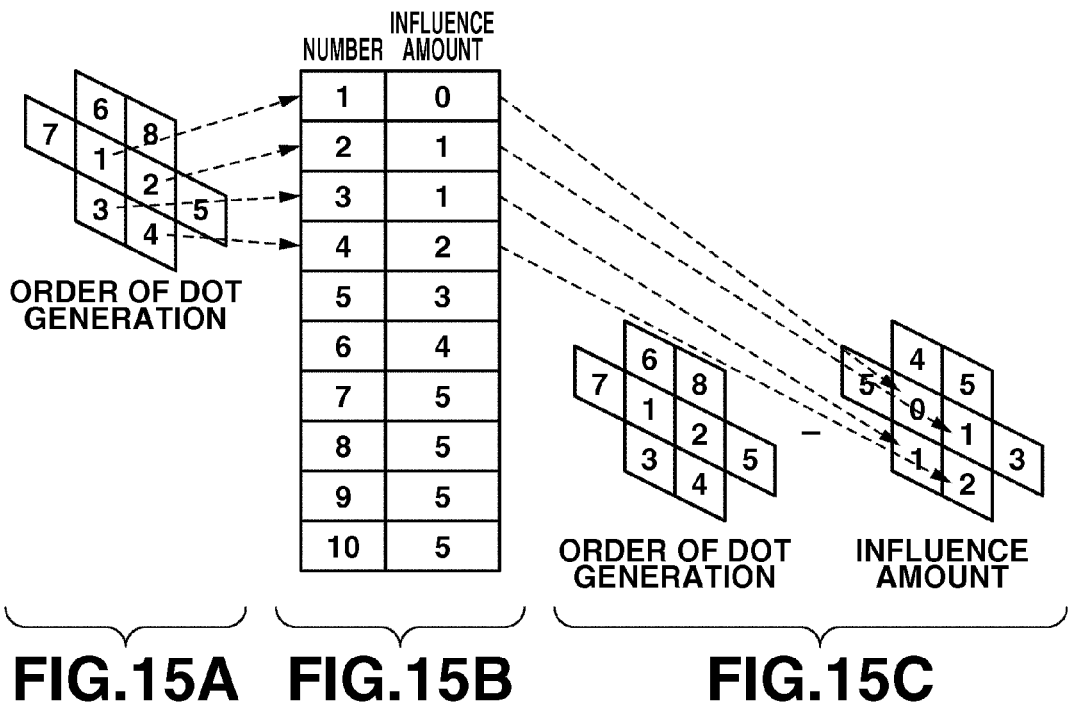
FIGS. 15A, 15B, 15C, 15D, and 15E are diagrams conceptually illustrating a result of the intermediate pattern generation processing.
Figures 15D, 15E:
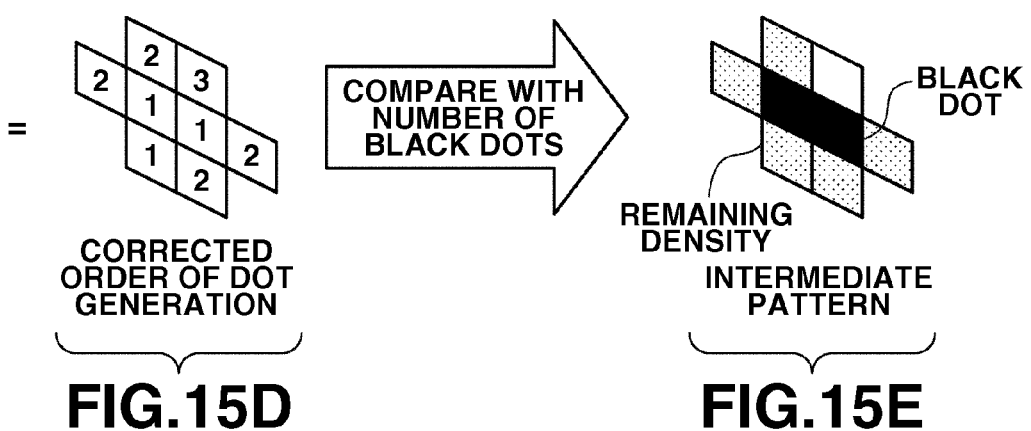

The intermediate pattern generation processing according to the present exemplary embodiment differs from that of the second exemplary embodiment in the operation of step S1204 and subsequent steps. In step S1204, the intermediate pattern generation unit 104 subtracts the amount of influence from the order of dot generation of the pixel of interest to determine the corrected order of dot generation (FIG. 15C). In step S1205, the intermediate pattern generation unit 104 compares the number of black dots calculated by the density information conversion processing unit 102 with the corrected order of dot generation. If the number of black dots is greater than or equal to the corrected order of dot generation (YES in step S1205), the intermediate pattern generation unit 104 proceeds to step S1207. In step S1207, the intermediate pattern generation unit 104 sets the output value of the pixel of interest to 255 (black dot). If the corrected order of dot generation is greater than the number of black dots (NO in step S1205), the intermediate pattern generation unit 104 proceeds to step S1206. In step S1206, the intermediate pattern generation unit 104 compares the sum of the number of black dots and 1 with the corrected order of dot generation. The reason for the addition of 1 to the number of black dots is the same as described for the intermediate pattern generation processing according to the second exemplary embodiment. That is, the remaining density is to be arranged in the position of the number subsequent to that at which all the black pixels have been arranged by reference in the order of dot generation. If the compared values coincide (YES in step S1206), the intermediate pattern generation unit 104 proceeds to step S1208. In step S1208, the intermediate pattern generation unit 104 sets the remaining density as the output value of the pixel of interest. If the compared values do not coincide (NO in step S1206), the intermediate pattern generation unit 104 proceeds to step S1209. In step S1209, the intermediate pattern generation unit 104 sets the output value of the pixel of interest to 0 (white dot).

As described above, the configuration for reflecting the amount of influence upon the order of selection can provide similar effects.

Figure 16:
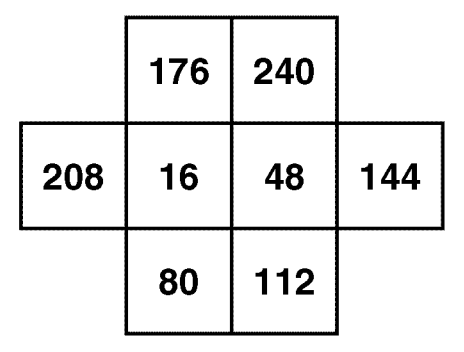
Figure 17:
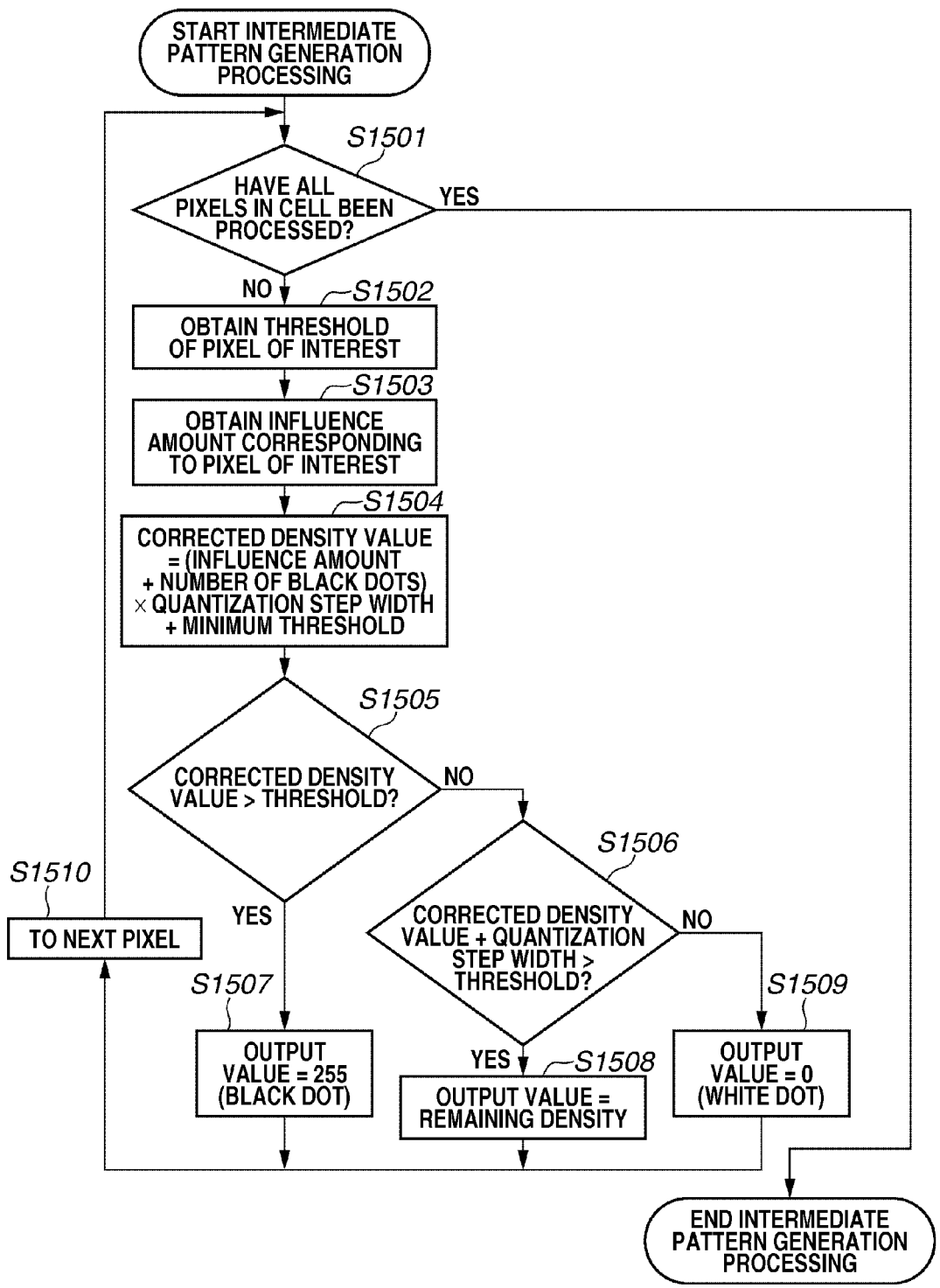
FIG. 17 is a diagram illustrating a flowchart of intermediate pattern generation processing.

In the second exemplary embodiment, the intermediate pattern is generated by comparing the sum of the amount of influence and the number of black dots with the order of dot generation. The present sixth exemplary embodiment deals with a different configuration for generating a similar intermediate pattern, in which a threshold matrix is used. FIG. 16 illustrates the threshold matrix used in the sixth exemplary embodiment. Numerical values in FIG. 16 indicate thresholds for the respective positions of input pixels. Description of components similar to those of the second exemplary embodiment will be omitted. FIG. 17 illustrates a flowchart of the intermediate pattern generation processing performed by the intermediate pattern generation unit 104 which is applicable to the sixth exemplary embodiment. FIGS. 18A to 18E are diagrams conceptually illustrating the process of generating an intermediate pattern according to the flowchart of FIG. 17.

The flowchart illustrated in FIG. 17 differs from that of the second exemplary embodiment in the operation of step S1502 and the operations of step S1504 and subsequent steps. In step S1502, the intermediate pattern generation unit 104 obtains a threshold corresponding to the position of the input pixel. In step S1503, the intermediate pattern generation unit 104 obtains the amount of influence calculated by the influence amount calculation unit 103. In step S1504, the intermediate pattern generation unit 104 adds the number of black dots calculated by the density information conversion processing unit 102 to the amount of influence, multiplies the resultant by a quantization step width, and adds a predetermined value thereto (FIG. 18C). The minimum threshold in the threshold matrix is used as the predetermined value, whereas a value near half the quantization step width may be used. The resulting value is referred to as a corrected density value (FIG.

18D). The intermediate pattern generation unit 104 proceeds to step S1505. In step S1505, the intermediate pattern generation unit 104 compares the corrected density value of the pixel of interest with the threshold. If the threshold is smaller (YES in step S1505), the intermediate pattern generation unit 104 proceeds to step S1507. In step S1507, the intermediate pattern generation unit 104 sets the output value of the pixel of interest to 255 (black dot). If not (NO in step S1505), the intermediate pattern generation unit 104 proceeds to step S1506. In step S1506, the intermediate pattern generation unit 104 compares the sum of the corrected density value and the quantization step width with the threshold. If the threshold is smaller (YES in step S1506), the intermediate pattern generation unit 104 proceeds to step S1508. In step S1508, the intermediate pattern generation unit 104 sets the remaining density as the output value of the pixel of interest. If not (NO in step S1506), the intermediate pattern processing unit 104 proceeds to step S1509. In step S1509, the intermediate pattern processing unit 104 sets the output value of the pixel of interest to 0 (white dot) (FIG. 18E).

As described above, the configuration using the threshold matrix can provide similar effects to those of the foregoing exemplary embodiments. While the sixth exemplary embodiment has dealt with the configuration for reflecting the amount of influence upon the density of a portion having the half gradation attribute, the amount of influence may be reflected on the threshold. In such a case, the intermediate pattern generation unit 104 determines a density value=the number of black dots×the quantization step width+the minimum threshold, instead of the corrected density value. Instead of the threshold, the intermediate pattern generation unit 104 determines a corrected threshold on which the amount of influence is reflected, by the corrected threshold=the threshold−the amount of influence×the quantization step width. The intermediate pattern generation unit 104 then compares the density value with the corrected threshold.

With the threshold matrix, dots are generated in ascending order of the thresholds. By utilizing this, the threshold matrix may be used as the order of dot generation. In such a case, the order of dot generation need not be separately retained. The influence amount table is generated by adding 1 to the amount of influence of the pixel of interest and the amounts of influence of pixels having thresholds greater than the threshold corresponding to the pixel of interest, if the pixel of interest is determined to be a pixel representing a dot by the attribute determination.

The threshold matrix according to the present exemplary embodiment is set to have the same shape as that of the first unit area (cell) for determining attributes. As mentioned previously, this is not restrictive. The threshold matrix, a second unit area, may be set according to a desired screen number and screen angle. It is desirable that the thresholds in the first unit area are set to include all the thresholds of the threshold matrix. However, thresholds generally covering a dynamic range of the input image, like a sub matrix, can be used without a practical problem.

Figure 19:
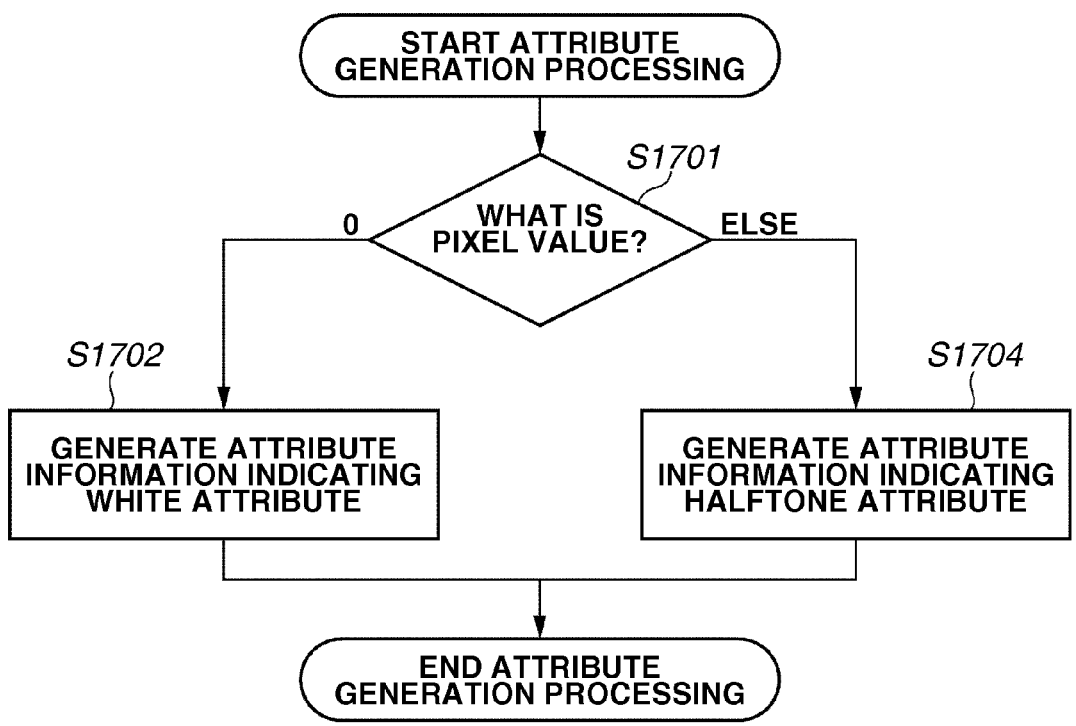
FIG. 19 is a diagram illustrating a flowchart of attribute generation processing.

In the foregoing exemplary embodiments, white/black pixels of the input image data are both detected as dot-representing pixels. However, the attribute generation unit 101 may be configured to detect only pixels having the white attribute which represent white dots. Description of components similar to those of the foregoing exemplary embodiments will be omitted. FIG. 19 illustrates a flowchart of the attribute generation processing performed by the attribute generation unit 101 according to a seventh exemplary embodiment.

If the pixel has a pixel value of 0 (0 in step S1701), then in step S1702, the attribute generation unit 101 generates attribute information indicating the white attribute. If the pixel has any other pixel value (ELSE in step S1701), then in step S1704, the attribute generation unit 101 generates attribute information indicating the half gradation attribute.

Figure 20:
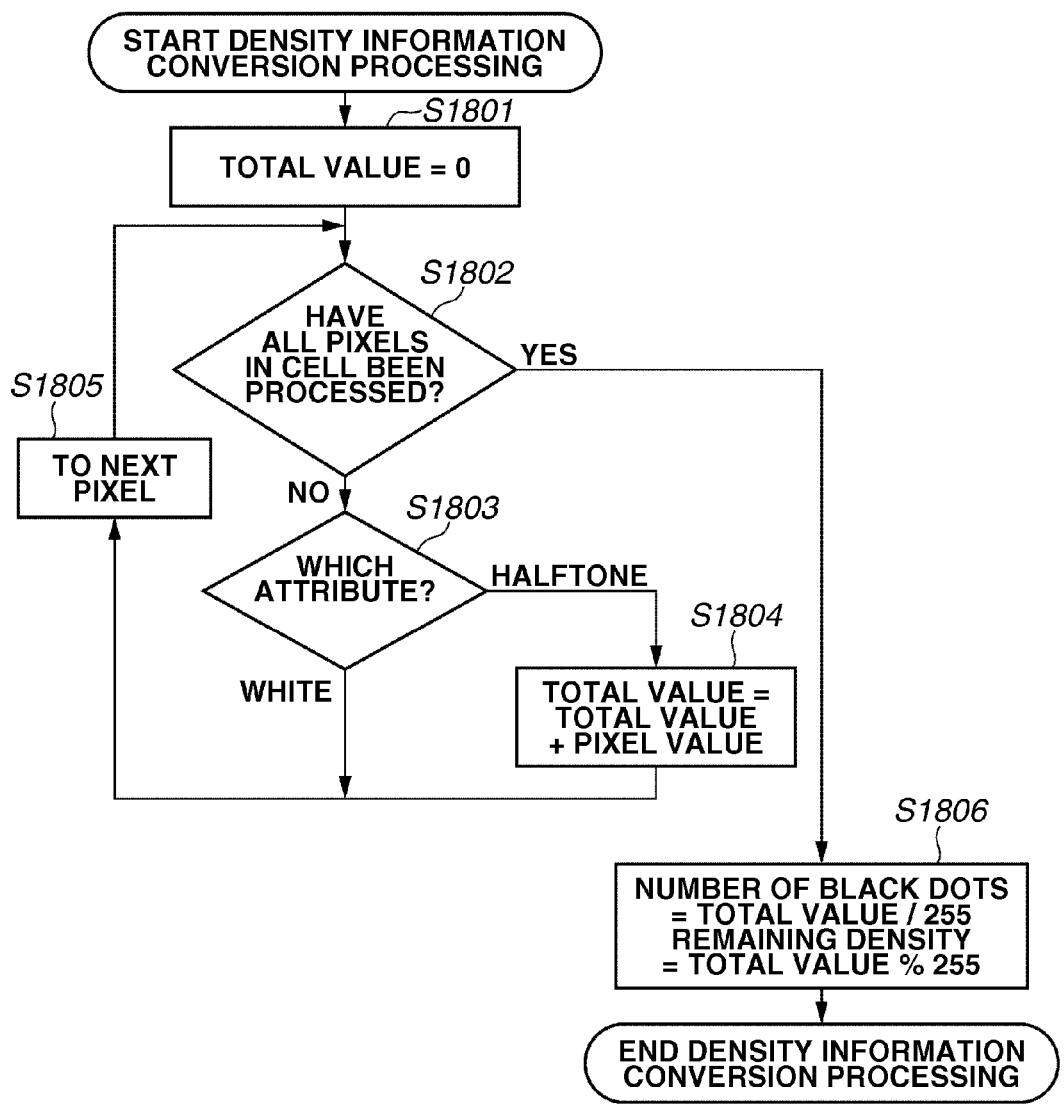
FIG. 20 is a diagram illustrating a flowchart of density information conversion processing.

As illustrated in FIG. 20, in step S1803, the density information conversion processing unit 102 only determines whether the pixel of interest has the white attribute or the half gradation attribute. If the pixel of interest has the half gradation attribute (HALFTONE in step S1803), then in step S1804, the density information conversion processing unit 102 adds the pixel value of the pixel of interest to the total value. If the pixel of interest has the white attribute (WHITE in step S1803), the density information conversion processing unit 102 proceeds to step S1805 to process the next pixel without changing the total value. Like the fourth exemplary embodiment, the density information conversion processing unit 102 may add the pixel value of the pixel having the white attribute to the total value. In such a case, the total value is the total of the pixel values in the cell regardless of the result of the attribute determination.

Figure 21:
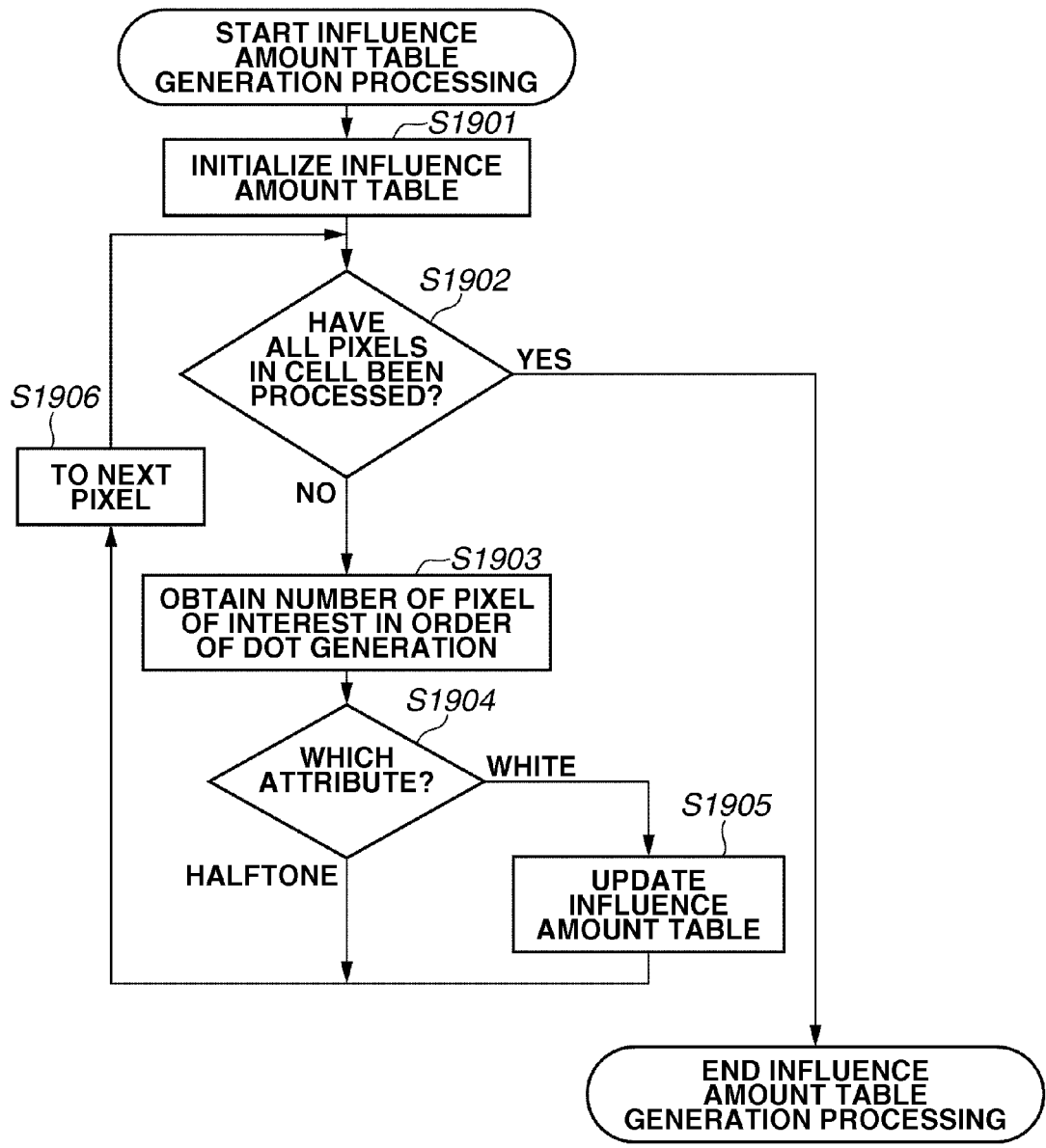
FIG. 21 is a diagram illustrating a flowchart of influence amount table generation processing.

As illustrated in FIG. 21, in step S1904, the influence amount calculation unit 103 only determines whether the pixel of interest has the white attribute or the half gradation attribute. If the pixel of interest has the white attribute (WHITE in step S1904), then in step S1905, the influence amount calculation unit 103 updates the influence amount table.

According to the present exemplary embodiment, even if the input image data includes characters/thin lines on a white background like a text or a graphic material, black dots are not generated on the white background. As a result, dots are concentrated on the characters/thin line portions, whereby a sharper image can be generated. Unlike the second exemplary embodiment, the mechanism for detecting pixels having the black attribute is not needed. This enables a simpler circuit configuration.

The foregoing exemplary embodiments have been described by using monochromatic (black) image data as examples. However, the exemplary embodiments may be applied to image data corresponding to each color. In such a case, the white pixel refers to a pixel having a pixel value equivalent to an off dot (non-print pixel where no dot is formed). The black pixel refers to a pixel having a pixel value equivalent to an on dot (print pixel where a dot is formed). Color image data is separated into pieces of image data about respective color materials that the information forming unit 2 has. The foregoing exemplary embodiments may be applied to perform halftone processing on the image data of each color component. For example, in the case of cyan image data, a pixel having a pixel value of 0 represents a white dot. A pixel having a pixel value of 255 represents a cyan dot. The number of cyan dots is calculated as the number of print pixels (the number of black dots in the foregoing exemplary embodiments). Further, suppose that the image forming unit 2 has cyan (C), magenta (M), yellow (Y), and black (K) color materials. An exemplary embodiment of the present disclosure may be applied to the image data corresponding to some of the colors among the pieces of image data corresponding to the color components. For instance, the foregoing exemplary embodiments may be applied only to the image data corresponding to black, while conventional halftone processing is performed on the image data corresponding to cyan, magenta, and yellow.

In the foregoing exemplary embodiments, the white/black attributes have been described to be the attributes of dot-representing pixels. However, this is not restrictive. For example, take a case of recording image data by using dark and light inks such as black and gray inks. Suppose that 256-gradation image data is ternarized, and the resulting image is recorded by printing an off dot for an output value of 0, a light ink (gray) dot for an output value of 1, and a dark ink (black) dot for an output value of 2. In such a case, a pixel value of 128 corresponding to the output value of 1 may be set as a reference value aside from near 0 and 255 of the input image data. In other words, the pixel value of 128 is determined to be one representing a light ink dot. In such a manner, the pixel values for representing the dots of the output image data are set according to the number of quantization levels in which the input image data is quantized by the halftone processing. The reference values of the pixel values can be set, for example, near the representative quantization values representing the print pixels.

The foregoing exemplary embodiments have described examples of the halftone processing unit 1 that generates output image data to be output to the electrophotographic image forming unit 2. However, such examples are not restrictive. For example, the image forming unit 2 may be an inkjet image forming unit. In such a case, the output image data can be halftone image data in which dots are dispersed as much as possible. The order of dot generation in a cell (unit of halftone processing) is set so that a predetermined area (for example, 256 pixels×256 pixels) including the cell have a blue noise characteristic. When black dots as many as the number of black dots corresponding to a total value are arranged according to the order of dot generation, an image group having the half gradation attribute in the cell forms a dot pattern of high dispersibility. As for pixels to preserve resolution (for example, white/black pixels like the foregoing exemplary embodiments), their pixel values are output even in the output image data. As a result, a high quality image having high dispersibility and preserving the resolution of the input image data can be obtained. Halftone processing using an error diffusion method has conventionally been used for an inkjet image forming unit. As compared to the error diffusion method, the exemplary embodiments of the present disclosure have high processing speed, need no feedback of quantization errors, and thus have the advantage of being capable of simple circuit configuration. Since the inkjet image forming unit expresses gradations by on/off of dots, the PWM processing unit 107 illustrated in FIG. 1 is not needed.

The foregoing exemplary embodiments have dealt with the case where a pixel value of 0 represents a white dot, and a pixel value of 255 (the maximum value of the input image data) represents a black dot. The exemplary embodiments may be similarly applied vice versa. In other words, the data format may be such that pixels having smaller pixel values express darker gradations (luminance data format).

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the exemplary embodiments of the present disclosure, it is possible to provide a method for obtaining favorable image data while preserving resolution by image processing for converting input image data into image data expressing pseudo gradations in each unit area.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-060269 filed Mar. 22, 2013, which is hereby incorporated by reference herein in its entirety.

What is claimed is:

1. An image processing apparatus capable of converting input image data into image data expressing a dot pattern cell by cell, the image processing apparatus comprising:
   a detection unit configured to detect a pixel having a specific pixel value in the input image data; and
   a determination unit configured to determine, cell by cell, an output value of a pixel included in each cell in the input image data,
   wherein the determination unit determines an output value of each of the pixels included in a cell to be processed except a pixel detected by the detection unit based on a number of print pixels according to a total value of pixels in a pixel group except the pixel detected by the detection unit, and
   wherein the determination unit determines an output value of the pixel having the specific pixel value detected by the detection unit in the cell to be processed based on a pixel value of the pixel.

2. The image processing apparatus according to claim 1, wherein the specific pixel value is a pixel value expressing a white pixel.

3. The image processing apparatus according to claim 2, wherein an output value indicating that no print pixel is arranged is output for the pixel having the pixel value expressing the white pixel.

4. The image processing apparatus according to claim 1, wherein the specific pixel value is a pixel value expressing a black pixel.

5. The image processing apparatus according to claim 4, wherein an output value indicating that a print pixel is arranged is output for the pixel having the pixel value expressing the black pixel.

6. The image processing apparatus according to claim 1, wherein the determination unit is configured to further retain order of generation of print pixels in the cell, and to arrange a pixel to be a print pixel in the pixel group according to the order of generation.

7. The image processing apparatus according to claim 6, wherein the order of generation is set so that pixels are determined to be print pixels in order from ones lying in a center of the cell.

8. The image processing apparatus according to claim 6, wherein the order of generation is set so that the cell has a blue noise characteristic.

9. The image processing apparatus according to claim 1, wherein the detection unit is configured to detect, cell by cell, a pixel having the specific pixel value.

10. The image processing apparatus according to claim 6, wherein the detection unit is configured to detect a pixel having the specific pixel value in units of an area larger than the cell.

11. The image processing apparatus according to claim 6, wherein the determination unit is configured to further include an influence amount calculation unit configured to calculate an amount of influence that a pixel not included in the pixel group has on the order of generation in the pixel group in a unit area in which the detection unit detects a pixel having the specific pixel value, and to determine an output value of each pixel in the unit area based on the number of print pixels and the amount of influence.

12. The image processing apparatus according to claim 1, wherein the image processing apparatus is configured to process image data corresponding to a plurality of color components.

13. An image forming apparatus configured to form an image on a recording medium based on the image data processed by the image processing apparatus according to claim 1.

14. The image processing apparatus according to claim 1, wherein a number of pixels, of which an output value is determined by the determination unit based on a number of print pixels according to a total value of pixel values of a pixel group, differs according to a number of pixels included in a cell detected by the detection unit.

15. The image processing apparatus according to claim 1,
wherein in a case where, with respect to N pixels included in a cell to be processed, a number M of pixels detected by the detection unit is 0, an output value of each of the pixels included in the cell is determined based on a number of print pixels according to a total value of the N pixels included in the cell and an output value of each of the pixels included in the cell is not determined based on a pixel value of a pixel,
wherein in a case where the number M of pixels detected by the detection unit is N, an output value of each of the pixels included in the cell is determined based on a pixel value of a pixel and an output value of each of the pixels included in the cell is not determined based on the number of print pixels according to the total value of the N pixels included in the cell, and
wherein in a case where the number M of pixels detected by the detection unit is 1 or more and smaller than N, the determination unit determines an output value of each of the pixels except a pixel detected by the detection unit based on a number of print pixels according to a total value of M pixels, and determines an output value based on a pixel value of each of (N−M) pixels detected by the detection unit.

16. An image processing method for converting input image data into image data expressing a dot pattern cell by cell, the image forming method comprising:
detecting a pixel having a specific pixel value in the input image data; and
determining, cell by cell, an output value of a pixel included in each cell in the input image data,
wherein the determining determines an output value of each of the pixels included in a cell to be processed except a pixel detected based on a number of print pixels according to a total value of pixels in a pixel group except the detected pixel, and
wherein the determining determines an output value of the detected pixel having the specific pixel value in the cell to be processed based on a pixel value of the pixel.

17. A non-transitory storage medium storing a computer program for causing a computer, when read and executed by the computer, to execute a method comprising:
detecting a pixel having a specific pixel value in the input image data; and
determining, cell by cell, an output value of a pixel included in each cell in the input image data,
wherein the determining determines an output value of each of the pixels included in a cell to be processed except a pixel detected based on a number of print pixels according to a total value of pixels in a pixel group except the detected pixel, and
wherein the determining determines an output value of the detected pixel having the specific pixel value in the cell to be processed based on a pixel value of the pixel.

* * * * *